US006847139B2

(12) United States Patent
Ueda et al.

(10) Patent No.: US 6,847,139 B2
(45) Date of Patent: Jan. 25, 2005

(54) MULTI-FUNCTIONAL VIBRATING ACTUATOR

(75) Inventors: Minoru Ueda, Adachi-ku (JP); Kenji Ueno, Adachi-ku (JP); Takayuki Kumagai, Adachi-ku (JP)

(73) Assignee: Namiki Seimitsu Houseki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/469,149

(22) PCT Filed: Dec. 27, 2002

(86) PCT No.: PCT/JP02/13787

§ 371 (c)(1), (2), (4) Date: Aug. 27, 2003

(87) PCT Pub. No.: WO03/057375

PCT Pub. Date: Jul. 17, 2003

(65) Prior Publication Data

US 2004/0075351 A1 Apr. 22, 2004

(30) Foreign Application Priority Data

Dec. 28, 2001 (JP) ....................................... 2001-401886

(51) Int. Cl.[7] .................................................. H02K 7/06

(52) U.S. Cl. ...................... 310/81; 340/338.1; 381/396; 381/402; 381/420

(58) Field of Search ......................... 310/81; 340/338.1, 340/384.73, 311.1; 381/396–433

(56) References Cited

U.S. PATENT DOCUMENTS

| | | | | | |
|---|---|---|---|---|---|
| 5,894,263 | A | * | 4/1999 | Shimakawa et al. | 340/388.1 |
| 5,903,076 | A | * | 5/1999 | Suyama | 310/81 |
| 6,208,237 | B1 | * | 3/2001 | Saiki et al. | 340/388.1 |
| 6,529,611 | B2 | * | 3/2003 | Kobayashi et al. | 381/396 |
| 6,539,097 | B2 | * | 3/2003 | Sakai | 381/413 |
| 6,608,541 | B2 | * | 8/2003 | Shiraki et al. | 335/222 |
| 6,611,605 | B2 | * | 8/2003 | Kim | 381/406 |
| 6,611,606 | B2 | * | 8/2003 | Guenther | 381/421 |
| 6,639,995 | B2 | * | 10/2003 | Yu | 381/412 |

FOREIGN PATENT DOCUMENTS

| | | |
|---|---|---|
| JP | 9-261917 | 10/1997 |
| JP | 2001-104880 | 4/2001 |

* cited by examiner

*Primary Examiner*—Dang Le
(74) *Attorney, Agent, or Firm*—Nixon Peabody LLP; Donald R. Studebaker

(57) ABSTRACT

An amount of movement of an air passing through a clearance G2 is adjusted by adjusting the clearance G2 by placing an outer shape surface 35 of a yoke 3 in proximity of an inner side surface of a housing 1. Accordingly, a vibration characteristic having a wide frequency bandwidth can be obtained, thereby improving stability and convenience of body-sensible vibration characteristic of a multi-functional vibration actuator.

9 Claims, 19 Drawing Sheets

MULTI-FUNCTIONAL VIBRATING ACTUATOR

TECHNICAL FIELD

The present invention relates to an improvement of a body-sensible vibration characteristic of a multifunctional vibration actuator having a function of generating a body-sensible vibration along with a function of generating a sound such as a ring tone or the like.

BACKGROUND ART

A multifunctional vibration actuator for allowing a single device to perform generation of a ring tone and a body-sensible vibration as an incoming call notification means for portable terminal units represented by portable telephones, has been devised and installed in such portable terminal units.

As shown in FIG. 19, this multifunctional vibration actuator is structured with an approximately cylindrical housing 1 having openings on both sides, a magnetic circuit part in which a pole piece 2 and a yoke 3 are integrally fixed and formed on a magnet 4 so as to form a gap G1 that affects as a magnetic gap, a diaphragm 6 having a voice coil 5 being attached on its surface, and suspensions 7 and 7' respectively having supporting portions 7*a* that fixedly support the magnetic circuit part.

One example of the suspensions 7 and 7', as shown in FIG. 20, includes a ring portion 7*a* as a supporting portion that fixedly supports the magnetic circuit part, and three arms 7*b* to 7*d* being equally spaced (in FIG. 20, equally spaced by 120°) and elongated from an outer shape of the ring portion 7*a* in the same direction along the outer shape (circular shape in FIG. 20).

By the ring portion 7*a* of each of the suspensions 7 and 7' fixedly supporting the magnetic circuit part, and by ends of the arms 7*b* to 7*d* being fixed on an inner side surface of the housing 1, the magnetic circuit part is supported with capacity to vibrate in upward and downward directions of FIG. 19 due to deflection of the arms 7*b* to 7*d*. More specifically, the suspensions 7 and 7' with spacer rings 10*a* and 10*b* intervening therebetween are fixed by a stopper ring 11, so that the ring portions 7*a* at the center are engaged with an outer periphery of the yoke 3.

Further, a lead wire of the voice coil 5 is drawn out to an outside of the housing 1 and connected to terminal metal fitting 8 being attached to the outside of the housing 1, and the diaphragm 6 is placed to cover the one opening of the housing 1 so as to arranged the voice coil 5 in the magnetic gap G1. Further, the other opening of the housing 1 is covered by a cover 9 having a through hole 9*a*, and the cover 9 is fixed thereon.

The multifunctional vibration actuator is assembled to have a clearance G2 that permits deflection of the arms 7*b* to 7*d* between the inner side surface of the housing 1 and an outer shape surface of the yoke 3.

When an electrical signal of low frequency band is applied to the voice coil 5 of the multifunctional vibration actuator of such structure, an electromagnetic effect around the magnetic gap G1 causes the magnetic circuit part to vibrate in upward and downward directions of FIG. 19, and this vibration is propagated to an outside of the multifunctional vibration actuator and then notified as a body-sensible vibration to a user of a terminal unit. On the other hand, when an electrical signal of high frequency band is applied, the electromagnetic effect similarly causes the diaphragm 6 to vibrate and generate a sound such as a ring tone or the like, which is then notified to the user.

A characteristic of a body-sensible vibration of this conventional multifunctional vibration actuator, as a characteristic shown by a solid line in FIG. 6, exhibits a sharp, namely, a rapid rise of resonance and a narrow frequency bandwidth in which a desired vibration acceleration can be obtained. Thus, in case a dispersion of a vibration characteristic attributed by manufacturing exists between each multifunctional vibration actuator, or in case an environment of using a terminal unit having the multifunctional vibration actuator changes, the vibration characteristic easily get out of the bandwidth due to the difficulty of determining a resonance point and to the narrow frequency bandwidth in which a desired vibration acceleration can be obtained. Therefore, the desired vibration acceleration is difficult to obtain, and from views of stability and convenience of a vibration characteristic, the conventional multifunctional vibration actuator has room for improvement.

Moreover, when a portable terminal unit having the multifunctional vibration actuator shown in FIG. 19 is in a call waiting status, in other words, the multifunctional vibration actuator is not operating, a shock to an external case of the portable terminal unit causes the magnetic circuit part to vibrate and generate a noise similar to a twang of string, which is represented as a "booming noise" (hereinafter, this noise is referred to as abnormal noise). This abnormal noise causes a user to feel that the external case of the portable terminal unit has insufficient stiffness, or to doubt that installed parts inside the terminal unit are improperly installed or malfunctioning.

DISCLOSURE OF THE INVENTION

As a result of dedicated development, the inventor of the present invention have found out that a use of an air inside a multifunctional vibration actuator as a damper is effective to improve stability of a body-sensible vibration characteristic. Therefore, an object of the present invention is to improve stability and convenience of a vibration characteristic by limiting movements of airs in a space formed by a diaphragm and a magnetic circuit part and in a space formed by the magnetic circuit part and a cover by adjusting a size of a clearance G2 that exists in the conventional multifunctional vibration actuator.

It is common that portable terminal units have different capabilities and specifications between their respective manufacturers, and it is also common that respective parts installed in the terminal units are differentiated in capabilities and specifications according to demands of their respective manufacturers. Therefore, another object of the present invention is to realize demands of respective manufacturers by adjusting and limiting movements of airs in the aforementioned spaces by adjusting a size of the clearance G2.

Furthermore, the present invention is to improve stability and convenience of a vibration characteristic not only by adjusting and limiting the clearance G2, but also by providing a through hole on the magnetic circuit part for adjusting and limiting movements of airs in the two spaces.

Furthermore, a further object of the present invention is to reduce an abnormal noise during a call waiting status.

The present invention provides a multifunctional vibration actuator including an approximately cylindrical housing having openings on both sides, a magnetic circuit part in which a pole piece and a yoke are integrally fixed and formed on a magnet so as to form a gap that affects as a magnetic gap, a diaphragm having a voice coil being attached on its surface, a suspension having a supporting portion that fixedly supports the magnetic circuit part, a cover to cover one of the openings, the diaphragm arranging the voice coil in the magnetic gap and being adhered on an edge of the housing so as to cover an opening on the opposite side of the opening being covered by the cover, a plurality of arms being elongated from an outer shape of the supporting portion along the outer shape, ends of the elongated arms being fixed on an inner side surface of the housing, and the magnetic circuit part vibrating in the housing by deflection of the arms upon application of an electrical signal to the voice coil, wherein at least one part of the housing, the diaphragm, and the cover is provided with a through hole, an outer shape surface of the yoke is placed in proximity of the inner side surface of the housing to form a clearance, and a frequency bandwidth in which a vibration of the magnetic circuit part is obtained is enhanced by limiting at least by the clearance amounts of movement of airs in a space being formed by the diaphragm and the magnetic circuit part and in a space being formed by the magnetic circuit part and the cover.

As described above, by placing the outer shape surface of the yoke in proximity of the inner side surface of the housing, the movements of airs inside the multifunctional vibration actuator can be adjusted and limited, so that the airs act as dampers. Thus, the present invention aims to improve stability and convenience of a vibration characteristic.

Furthermore, the present invention provides a multifunctional vibration actuator including an approximately cylindrical housing having openings on both sides, a magnetic circuit part in which a pole piece and a yoke are integrally fixed and formed on a magnet so as to form a gap that affects as a magnetic gap, a diaphragm having a voice coil being attached on its surface, a suspension having a supporting portion that fixedly supports the magnetic circuit part, a cover to cover one of the openings, the diaphragm arranging the voice coil in the magnetic gap and being adhered on an edge of the housing so as to cover an opening on the opposite side of the opening being covered by the cover, a plurality of arms being elongated from an outer shape of the supporting portion along the outer shape, ends of the elongated arms being fixed on an inner side surface of the housing, and the magnetic circuit part vibrating in the housing by deflection of the arms upon application of an electrical signal to the voice coil, wherein at least one part of the housing, the diaphragm, and the cover is provided with a through hole, a ring that conforms to a shape of an outer shape of the yoke is engaged with an outer shape surface of the yoke to form a clearance between an outer shape surface of the ring and the inner side surface of the housing, and a frequency bandwidth in which a vibration of the magnetic circuit part is obtained is enhanced by limiting at least by the clearance amounts of movement of airs in a space being formed by the diaphragm and the magnetic circuit part and in a space being formed by the magnetic circuit part and the cover.

In accordance with the above structure, it becomes possible to adjust the clearance G2 by preparing a ring of different size and engaging it with the outer shape surface of the yoke having a predetermined size. Therefore, in addition to the improvement of stability and convenience of a body-sensible vibration characteristic, the present invention allows to change a vibration characteristic easily with reduced cost.

Furthermore, the present invention provides a multifunctional vibration actuator including at least an approximately cylindrical housing having openings on both sides, a magnetic circuit part in which a pole piece and a yoke are integrally fixed and formed on a magnet so as to form a gap that affects as a magnetic gap, a diaphragm having a voice coil being attached on its surface, a suspension having a supporting portion that fixedly supports the magnetic circuit part, a cover to cover one of the openings, the diaphragm arranging the voice coil in the magnetic gap and being adhered on an edge of the housing so as to cover an opening on the opposite side of the opening being covered by the cover, a plurality of arms being elongated from an outer shape of the supporting portion along the outer shape, ends of the elongated arms being fixed on an inner side surface of the housing, and the magnetic circuit part vibrating in the housing by deflection of the arms upon application of an electrical signal to the voice coil, wherein at least one part of the housing, the diaphragm, and the cover is provided with a through hole, the magnetic circuit part is provided with a through hole, and a frequency bandwidth in which a vibration of the magnetic circuit part is obtained is enhanced by limiting at least by the through hole amounts of movement of airs in a space being formed by the diaphragm and the magnetic circuit part and in a space being formed by the magnetic circuit part and the cover.

In accordance with the above structure, it becomes unnecessary to change sizes of parts or to have new additional parts, and therefore, in addition to the improvement of stability and convenience of a body-sensible vibration characteristic, the present invention allows changing a vibration characteristic more easily with reduced cost.

The present invention is a multifunctional actuator including a magnetic circuit part for forming a magnetic path, a suspension for supporting the magnetic circuit part, a diaphragm arranged opposite to the magnetic circuit part, a voice coil attached on the diaphragm and inserted into a magnetic gap formed on the magnetic circuit part, and a housing for accommodating the magnetic circuit part, wherein the magnetic circuit part is arranged such that a side surface of the magnetic circuit part is being separated from an inner surface of the housing by a clearance that limits an amount of movement of an air therebetween.

The present invention is a multifunctional actuator including a moving part having a magnetic circuit part for forming a magnetic path and a projecting portion that projects in a radial direction of the magnetic circuit part, a suspension for supporting the moving part, a diaphragm arranged opposite to the moving part, a voice coil attached on the diaphragm and inserted into a magnetic gap formed on the magnetic circuit part, and a housing for accommodating the moving part, wherein the moving part is arranged such that a side surface of the projecting portion is being separated from an inner surface of the housing by a clearance that limits an amount of movement of an air therebetween.

The present invention is a multifunctional actuator including a moving part having a magnetic circuit part for forming a magnetic path and a ring formed along a side surface of the magnetic circuit part, a suspension for supporting the moving part, a diaphragm arranged opposite to the moving part, a voice coil attached on the diaphragm and inserted into a magnetic gap formed on the magnetic circuit part, and a housing for accommodating the moving part, wherein the moving part is arranged such that a side surface of the ring is being separated from an inner surface of the housing by a clearance that limits an amount of movement of an air therebetween.

The present invention is the multifunctional actuator, wherein the housing is provided with a through hole that adjusts an amount of movement of an air.

The present invention is the multifunctional actuator, wherein the magnetic circuit part or the moving part is provided with a through hole that adjusts an amount of movement of an air.

The present invention is the multifunctional actuator, wherein the housing is provided with a through hole that adjusts an amount of movement of an air, and the magnetic circuit part or the moving part is provided with a through hole that adjusts an amount of movement of an air.

BEST MODE FOR CARRYING OUT THE INVENTION

<Internal Magnet Type Embodiment>

<First Embodiment>

Figure 1:
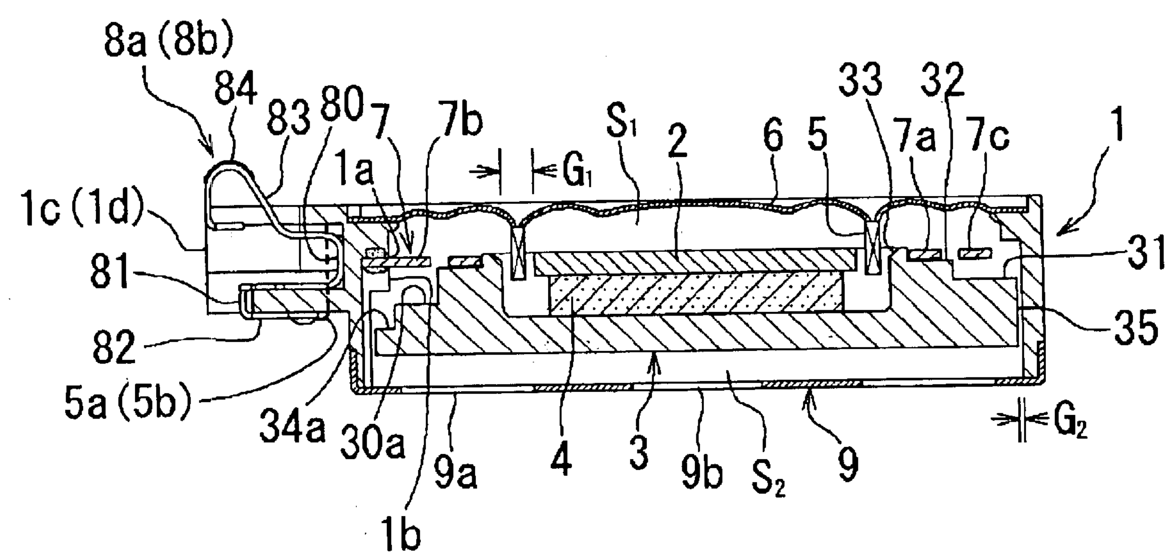
FIG. 1 is a cross-sectional view showing a multifunctional vibration actuator according to a first embodiment of the present invention.

A first embodiment of the multifunctional vibration actuator according to the present invention will be explained below with references to FIG. 1 to FIG. 6. The same components as those of the conventional multifunctional vibration actuator will be designated the same reference numerals, and repeating explanation will be omitted.

Figure 2:
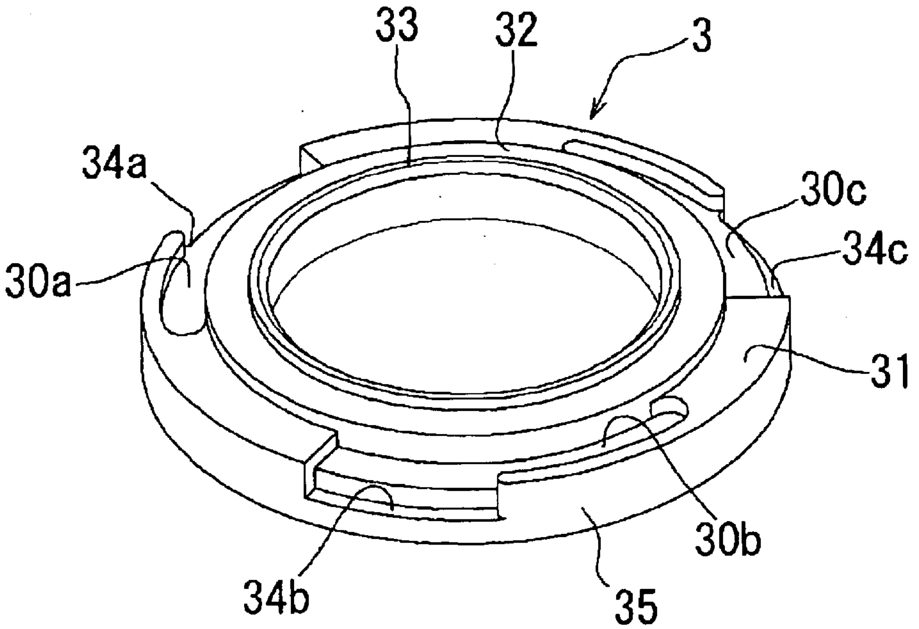
FIG. 2 is a perspective view showing a yoke to be assembled in the multifunctional vibration actuator of FIG. 1.

As shown in FIG. 1 and FIG. 2, on positions of a yoke 3 opposite to arms 7*b* to 7*d* of a suspension 7, escape portions 30*a* to 30*c* are formed on an outer periphery side of a step portion surface 31 in appropriate recessed shapes for the arms 7*b* to 7*d* to avert contact with these arms when these arms are deflected due to a generation of a body-sensible vibration. The step portion surface 31 is formed to be stepped down from an outer edge surface 32 on which a ring portion of the suspension 7 is to be placed and fixed. From the outer edge surface 32, a stopping frame 33 in a ring shape having an external diameter to be engaged with the ring portion 7*a* is formed in erected state.

In this embodiment, a projecting portion is a thick portion of the step portion surface 31, which is stepped down from the outer edge surface 32 and is integrally formed with the yoke 3. In this embodiment, a moving part includes a magnetic circuit part constituted of a pole piece 2, the yoke 3 and a magnet 4, and the projecting portion formed integrally with the yoke 3 in a radial direction.

On an outer periphery side of the escape portions 30*a* to 30*c*, escape portions 34*a* to 34*c* are formed by cutting out an outer periphery edge of the yoke in recessed shape. As shown in FIG. 1, since an inner side surface of a housing 1 is recessed inward to have step portions 1*a* for fixing the ends of the arms 7*b* to 7*d* of the suspension 7, the yoke 3 needs to have on the outer periphery edge the escape portions 34*a* to 34*c* in order not to contact with projecting edges 1*b* of the step portions 1*a*.

Figure 3:
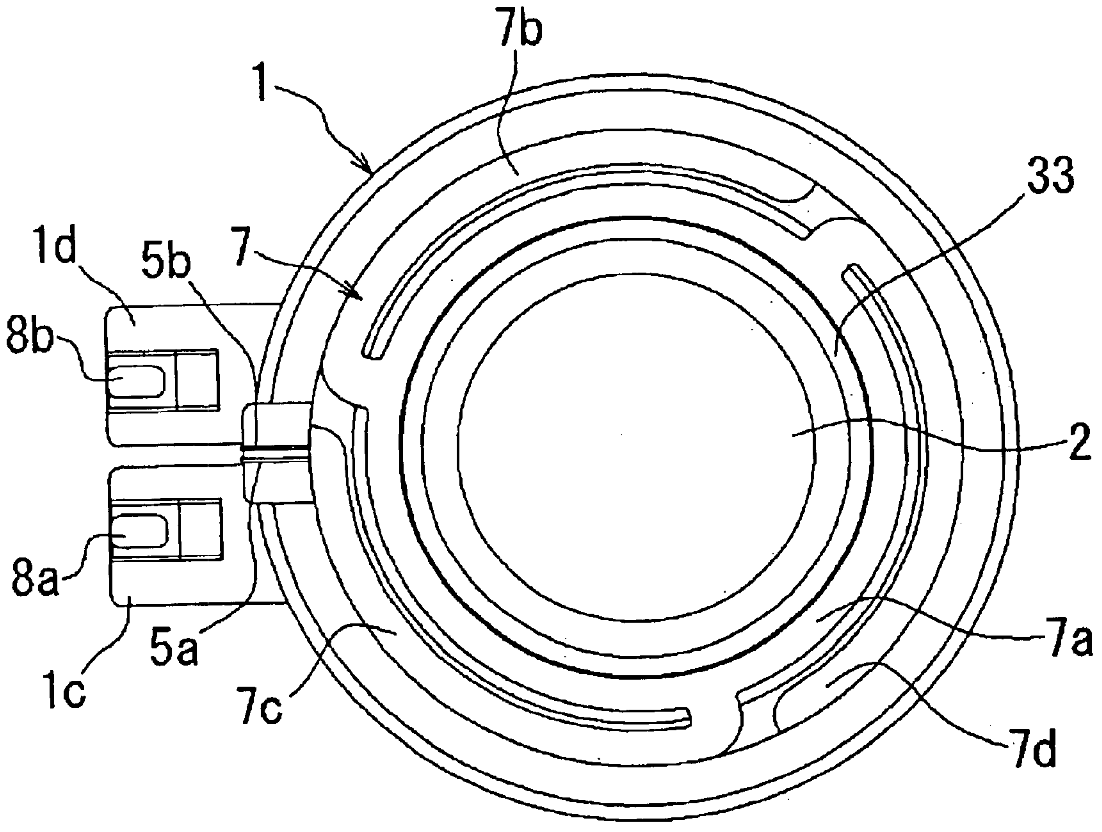
FIG. 3 is a plan view showing the multifunctional vibration actuator of FIG. 1 from a diaphragm side.

Further outside of the escape portions 34*a* to 34*c* is an outer shape surface 35 that forms an outer shape of the yoke. As shown in FIG. 1 and FIG. 3, the suspension 7 is attached on the yoke 3 by engaging the ring portion 7*a* with outside of the stopping frame 33, and placing and fixing the ring portion 7*a* on the outer edge surface 32 in a direction of thickness, with the arms 7*b* to 7*d* being aligned with the escaping portions 30*a* to 30*c*.

The ends of respective arms 7*b* and 7*c* (in FIGS. 1, 7*d* is hidden backside and is not shown) are adhered and fixed to the step portions 1*a* of the housing 1 and strained inside the housing 1, where the yoke 3 is assembled in the housing 1 by placing the outer shape surface 35 of the yoke 3 in proximity of the inner side surface of the housing 1 as close as possible to thereby form a clearance G2.

As the other structure, ends of lead wires 5*a* and 5*b* of a voice coil 5 are drawn out to outside of the housing 1 and electrically connected to terminal metal fittings 8*a* and 8*b* that are attached on the outside of the housing 1.

Each of the attached terminal metal fittings 8*a* and 8*b* is formed by folding to have a fitting part 80 in a U-shape at the center, an erecting part 81 having a predetermined space from one end of the fitting part 80, a flat board part 82 for connecting a lead wire folded parallel to the fitting part 80 where the erecting part 81 intervening therebetween, a leaf spring part 83 stretched at an angle from the other end of the fitting part 80, and a connecting part 84 curving in an arch shape for connecting a power supply land.

As shown in FIG. 1 and FIG. 3, the terminal metal fittings 8*a* and 8*b* are fitted and fixed by the fitting parts 80 with terminal boards 1*c* and 1*d* of the housing 1, the lead wires 5*a* and 5*b* of the voice coil 5 are wired between the terminal boards 1*c* and 1*d* and connected to the flat board parts 82, and the connecting parts 84 are displaced as springs and pressure-welded to power supply lands of a circuit board so as to ensure the electrical connection.

Figure 4:
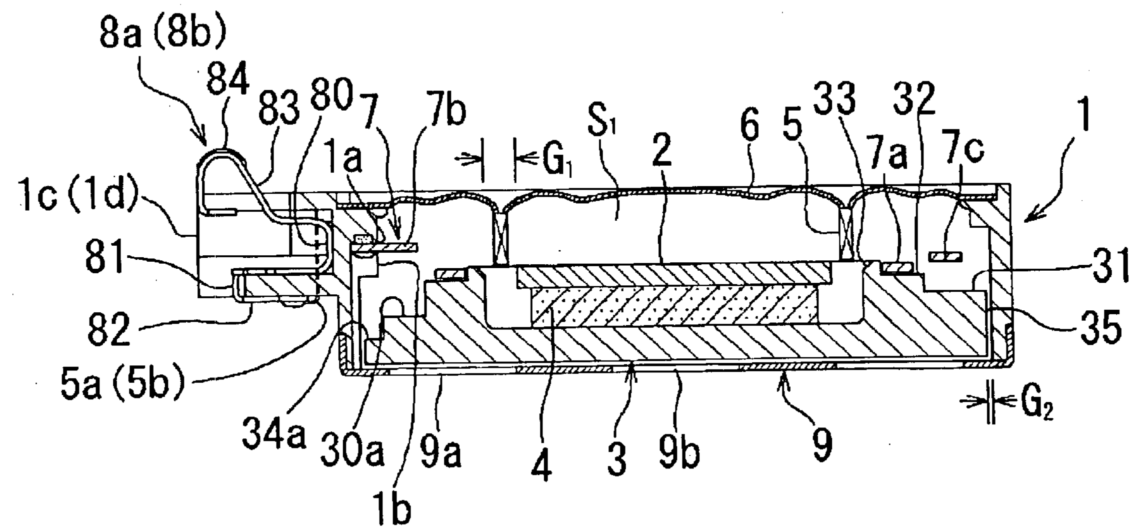
FIG. 4 is an explanatory view showing an operation in a low amplitude status of a magnetic circuit part of the multifunctional vibration actuator of FIG. 1.
Figure 5:
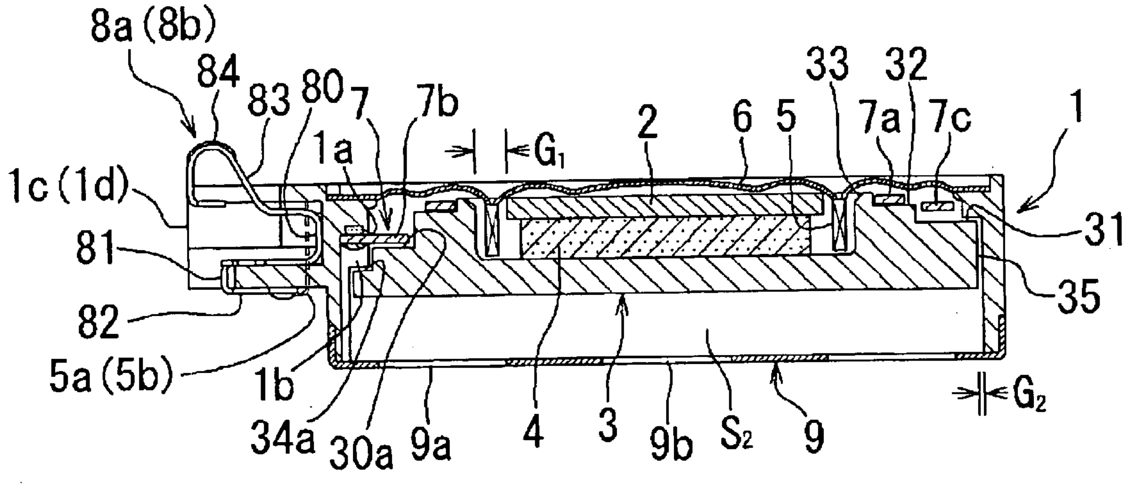
FIG. 5 is an explanatory view showing an operation in a high amplitude status of a magnetic circuit part of the multifunctional vibration actuator of FIG. 1.
Figure 6:
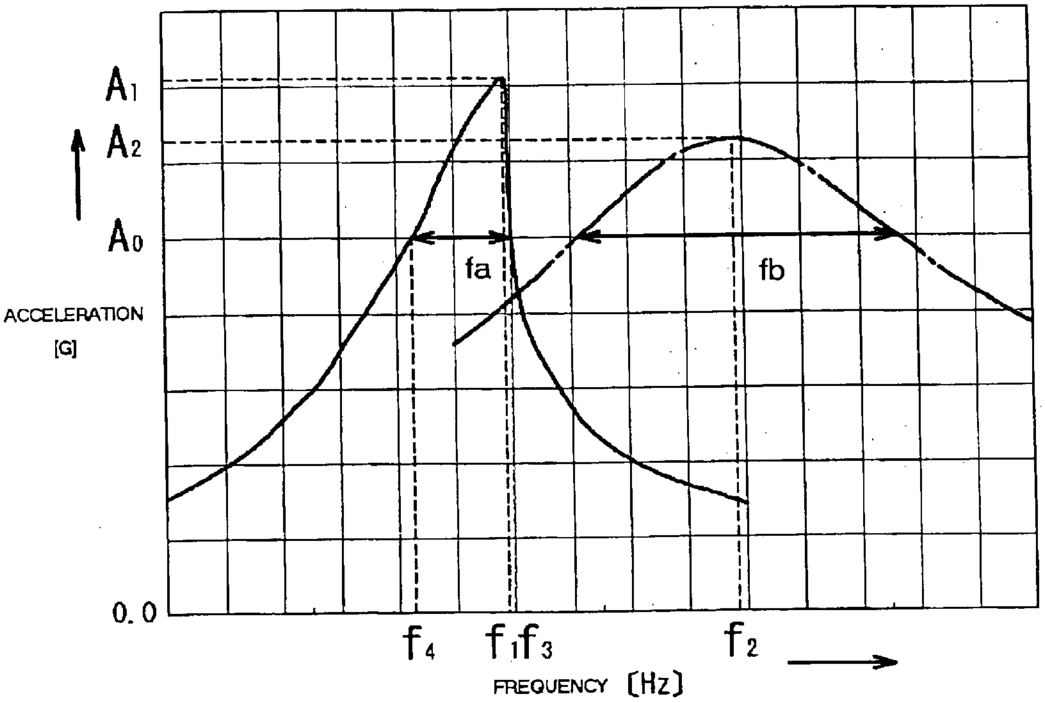
FIG. 6 is a characteristic graph showing vibration characteristics of a multifunctional vibration actuator according to the present invention and of a multifunctional vibration actuator according to the conventional art.

Next, the operation principle and effects of the multifunctional vibration actuator of the present invention will be explained. As shown in FIG. 4 and FIG. 5, when an electrical signal between 100 Hz or more and 200 Hz or less, preferably between 120 to 160 Hz, is applied to the voice coil 5 for example, the magnetic circuit part vibrates up and down by an electromagnetic effect of the voice coil 5 and the magnetic circuit part in the vicinity of the magnetic gap G1, with the clearance G2 being retained therebetween. When the magnetic circuit part vibrates up and down, the vibration is propagated to airs inside the multifunctional vibration actuator, namely, an inner air in a space S1 formed by a diaphragm 6 and the magnetic circuit part, and an inner air in a space S2 formed by the magnetic circuit part and a cover 9, and the airs in these spaces vibrate up and down as well.

Figure 19:
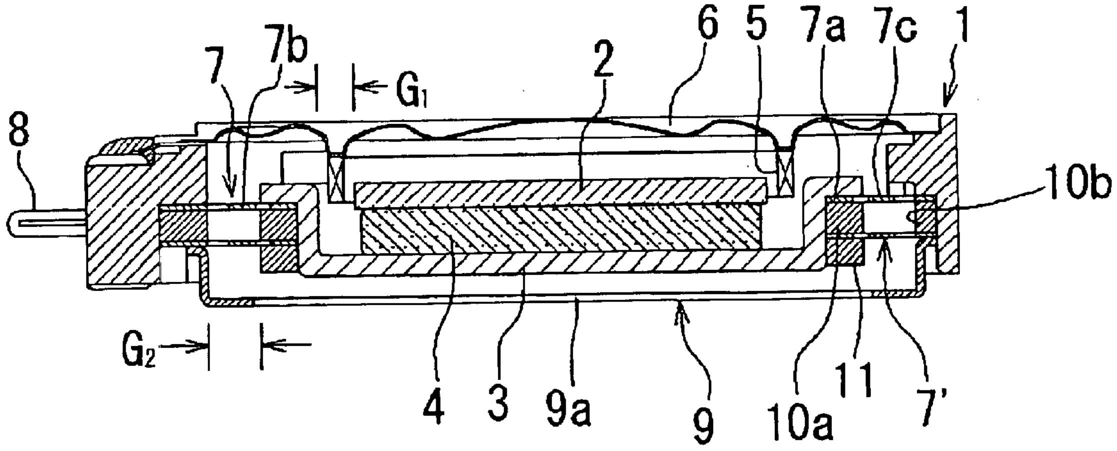
FIG. 19 is a cross-sectional view showing a multifunctional vibration actuator according to a general example.
Figure 20:
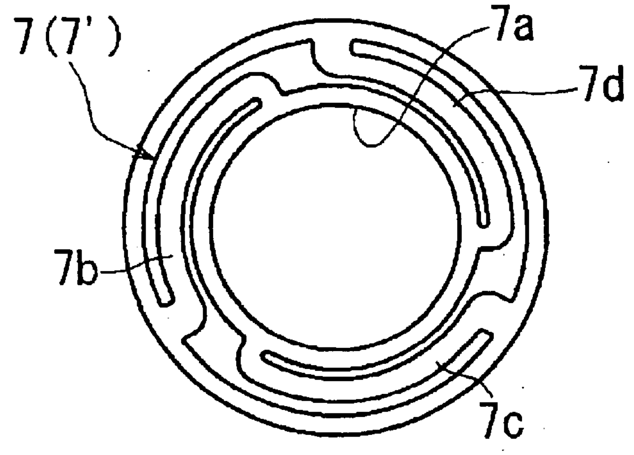
FIG. 20 is a plan view showing an example of a suspension to be assembled in the multifunctional vibration actuator according to a general example.

When regarding air as fluid, the air moved up and down in the spaces S1 and S2 try to go back and forth between these spaces through the clearance G2. However, as described above, the clearance G2 is formed by placing the outer shape surface 35 of the yoke 3 in proximity of the inner side surface of the housing 1 as close as possible, so it is extremely small as compared to the clearance G2 of the conventional multifunctional actuator (refer to FIG. 19). Therefore, the inner airs in the spaces S1 and S2 moving up and down apply air pressures which are caused by the movement to the extremely small clearance G2. It will be difficult for the pressured airs to pass through the extremely small clearance G2 so that, as a result, amounts of airs mutually moves between the two spaces S1 and S2 will be limited.

The airs limited in amount to move try to stay in respective spaces S1 and S2. And the stayed airs affect as dampers to absorb the movement of vibrating up and down of the magnetic circuit part. Thus, the amplitude of vibrating up and down of the magnetic circuit part is limited, and then a vibration characteristic having less variation of acceleration relative to a variation of frequency with a gradually curved line as shown by a chain dashed line in FIG. 6 can be obtained. This vibration characteristic has various effects as follows.

First, acceleration needed for a body-sensible vibration can be obtained from much wider frequency bandwidth. To explain with reference to FIG. 6, for example, when the acceleration needed for a body-sensible vibration is defined as A0(zero) [G] or more, the frequency bandwidth in which the acceleration can be obtained is fa [Hz] for the conventional multifunctional vibration actuator, whereas it is fb [Hz] for the multifunctional vibration actuator of the present invention, which is clearly expanded. Accordingly, since the frequency bandwidth is wide, it is easy to determine an operation signal. Therefore, desired vibration acceleration can be easily obtained, and stability and convenience of a body-sensible vibration can be improved.

Second, a drop in an amount of body-sensible vibration is reduced. Also with reference to FIG. 6, an example of an acceleration needed for a body-sensible vibration being defined as A0 (zero) [G] or more will be explained. By the conventional multifunctional vibration actuator, the maximum acceleration A1 [G] is obtained in the vicinity of f1 [Hz], and it is a generation point of the maximum amount of body-sensible vibration, that is, a resonance point. However, when the frequency is moved to f1 [Hz] or more, the acceleration drops rapidly, and when it is f3 [Hz] or more, the acceleration drops to A0 (zero) [G] or less, and then the needed acceleration can no longer be obtained. When the frequency band is f1 [Hz] or less, although it is not as rapid as described above, the acceleration still drops, and when the frequency band is f4 [Hz] or less, it drops to A0(zero) [G] or less. Therefore, just a slight change of the frequency from the resonance point causes a rapid drop of an amount of body-sensible vibration, and when assembled in a terminal unit, according to the occasion, it is conceivable that it can cause a problem that the needed amount of body-sensible vibration for an incoming call notification cannot be obtained.

On the other hand, by the multifunctional vibration actuator of the present invention, the maximum acceleration A0(zero) [G] is obtained in the vicinity of f2 [Hz]. As it is clear from a comparison of the two vibration characteristics, the multifunctional vibration actuator of the present invention enables a drop of acceleration relative to the variation width of the frequency to be more gradual as compared to the conventional multifunctional vibration actuator. Accordingly, in case a shift of the resonance point between each multifunctional vibration actuator attributed by manufacturing occurs and causes a dispersion of body-sensible vibration characteristic, or in case an environment of using a terminal unit having the multifunctional vibration actuator changes and causes a shift of the resonance point, a rapid drop of an amount of body-sensible vibration can be prevented, and thus the problem that the needed amount of body-sensible vibration cannot be obtained can be prevented.

The multifunctional vibration actuator of the present invention also has a function of generating sound from the diaphragm 6, and when an outer frame (comprises the diaphragm 6, the housing 1, and the cover 9) of the multifunctional vibration actuator is made entirely airtight, it can cause an adverse effect to a vibration characteristic of the diaphragm when generating a low frequency sound, and a sound characteristic is deteriorated. On the other hand, flowing out of airs should be limited in order to use the airs inside the multifunctional vibration actuator as dampers. In this embodiment, to achieve these two contradictory elements in one multifunctional vibration actuator, the cover 9 is provided with through holes 9*a* and 9*b* for the air to flow in and out. Thus, the inner air in the space S2 can smoothly flow in and out, so that the sound characteristic will be maintained favorably. Meanwhile, the inner air in the space S2 cannot be used as a damper because the air pressure is no longer applied. However, in the clearance G2 the air flow is still limited as described above, so that the air in the space S1 side can be used as a damper, and thus the vibration characteristic shown by the chain dashed line in FIG. 6 can be obtained.

As has been described, the present invention is a highly effective solution for a multifunctional vibration actuator that generates a sound and a body-sensible vibration in one device to improve stability and convenience of body-sensible vibration without sacrificing a sound characteristic.

Also, the multifunctional vibration actuator according to the present invention is capable of applying to the voice coil 5 an electrical signal having the larger power value as compared to the conventional multifunctional vibration actuator.

Figure 7:
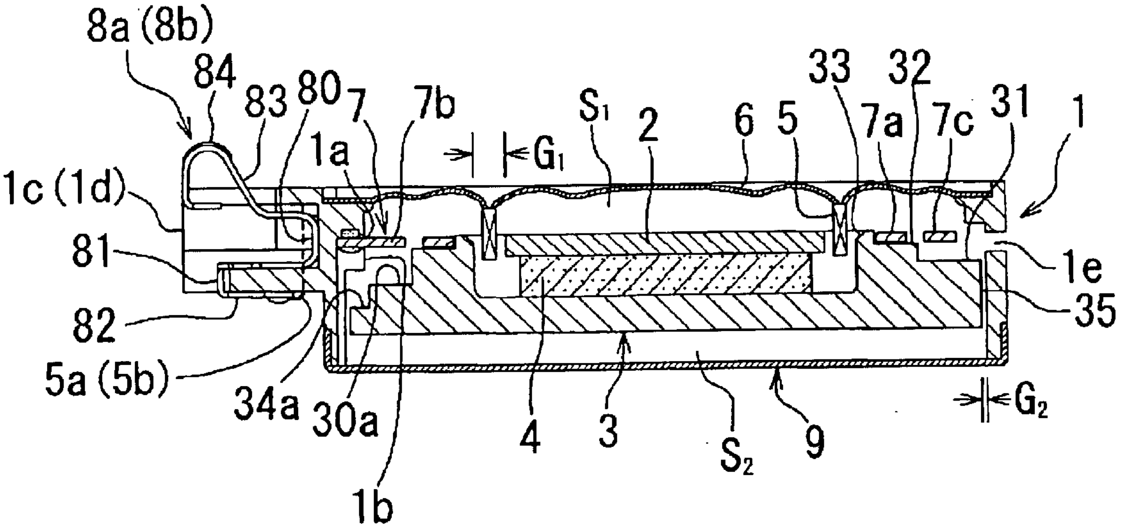
FIG. 7 is a cross-sectional view of a multifunctional vibration actuator that is provided with a through hole on a side surface of a housing according to the present invention.

The present invention can be modified in various ways according to technical concepts as a matter of course. For example, as shown in FIG. 7, the cover 9 may be an airtight structure to use the air in the space S2 as a damper, and then a through hole 1*e* may be provided on a side surface of the housing 1 to allow the inner air in the space S1 to freely move in and out so as to improve a sound characteristic. Thus, providing the through hole 1*e* on the side surface of the housing 1 eliminates the need to have a space between the multifunctional vibration actuator and the mounting table, which has an effect to reduce thickness in installed status.

Figure 21:
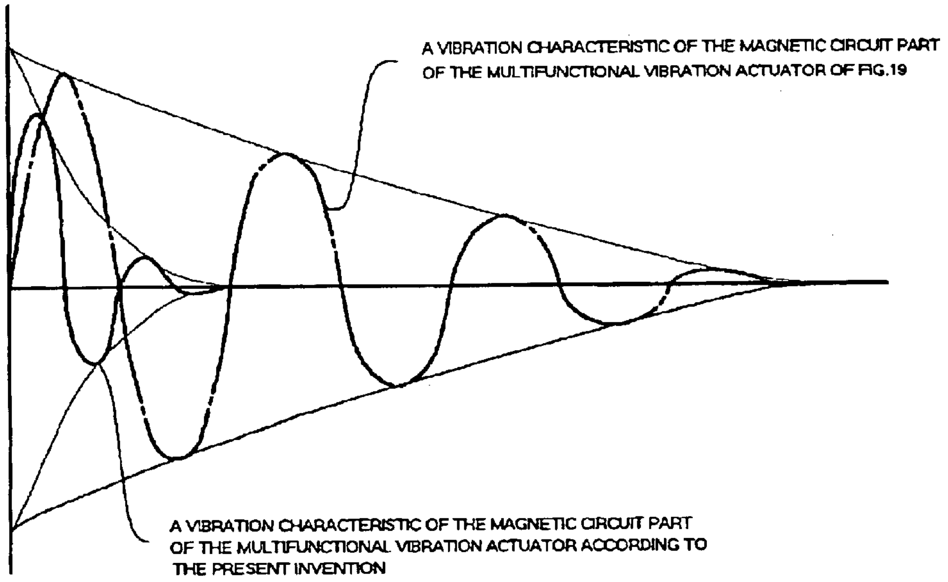
FIG. 21 is a curve graph showing vibration characteristics of magnetic circuit parts in multifunction vibration actuators that are measured through external cases of portable terminal units.

Furthermore, a principle and effect of the present invention of reducing an abnormal noise will be explained. If a shock is applied to an external case of a portable terminal unit having the multifunctional vibration actuator of FIG. 19, its vibration gets through to the inside of the multifunctional vibration actuator and vibrates the magnetic circuit part. As described above, since the magnetic circuit part is supported by a suspension, a vibration of the magnetic circuit part gradually converges and decreases with time. A vibration characteristic of the magnetic circuit part that is measured through the external case is shown by a chain dashed line in FIG. 21. The magnetic circuit part vibrating in accordance with the curve of the chain dashed line causes an air to vibrate and generate an abnormal noise, that is, a "booming noise" similar to a twang of string.

On the other hand, in the multifunctional vibration actuator according to the present invention, airs inside the actuator function as dampers to absorb a vibration of the magnetic circuit part, so that a vibration of the magnetic circuit part is inhibited to converge quickly. A curving line of a vibration characteristic of the multifunctional vibration actuator according to the present invention is shown by a solid line in FIG. 21. As shown by the solid line, the vibration characteristic of the multifunctional vibration actuator according to the present invention converges to zero more quickly as compared to the vibration characteristic of the conventional multifunctional vibration actuator shown in FIG. 19. Therefore, a sense of reverberation to be heard through the ear by a user of a portable terminal unit will be largely reduced. Thus the user hears reduced abnormal noise.

Figure 22:
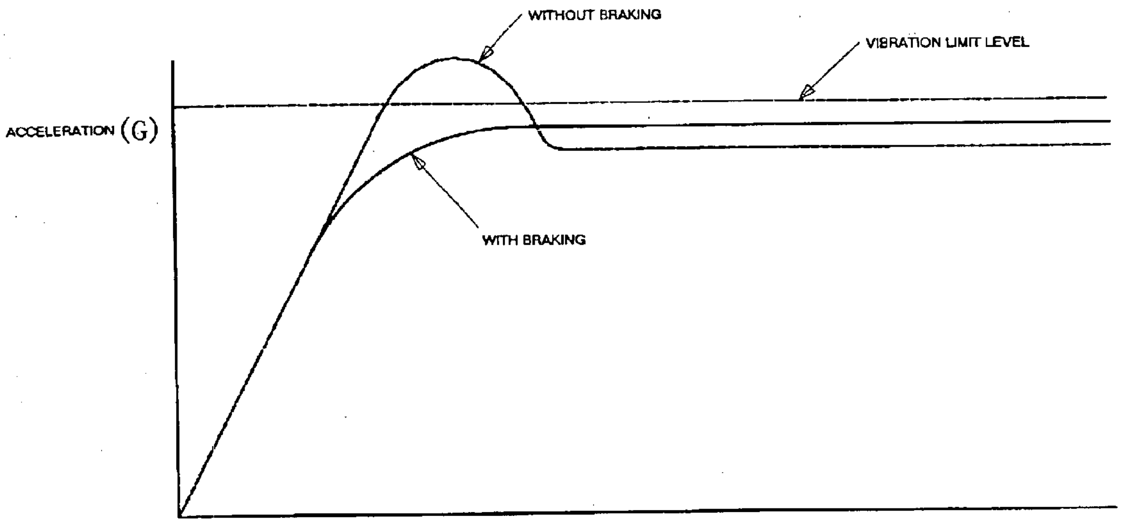
FIG. 22 is a graph explaining a rising characteristic of a multifunctional vibration actuator device according to the present invention.

Moreover, in the multifunctional vibration actuator according to the present invention, a rising characteristic of vibration is also improved as shown in FIG. 22. As shown by a dotted line, when a braking is not provided (as conventional cases, when an amount of movement of an air at the clearance G2 is not limited), and if acceleration in a steady state is set close to a vibration limit level, the acceleration exceeds the vibration limit level before it reaches the steady state, so that the abnormal noise occurs. On the other hand, when a braking is provided (as the present invention, when an amount of movement of an air at the clearance G2 is limited), the rising characteristic will be stable as shown by a solid line. Further, decreasing of amplitude will be quicker, so the acceleration does not exceed the vibration limit level. Accordingly, an occurrence of the abnormal noise can be prevented.

<Second Embodiment>

Figure 8:
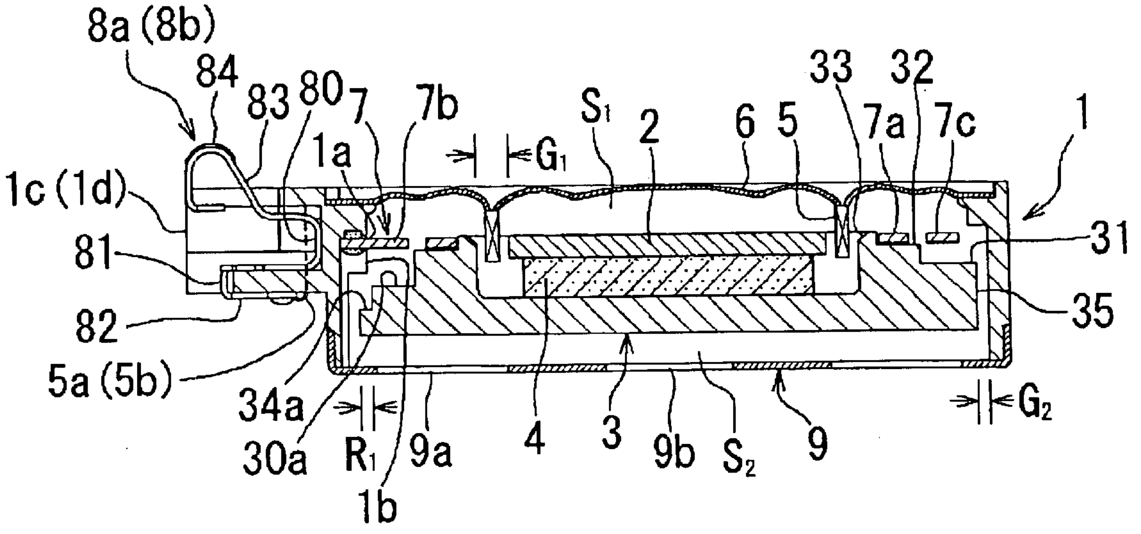
FIG. 8 is a cross-sectional view showing a multifunctional vibration actuator according to a second embodiment of the present invention.
Figure 9:
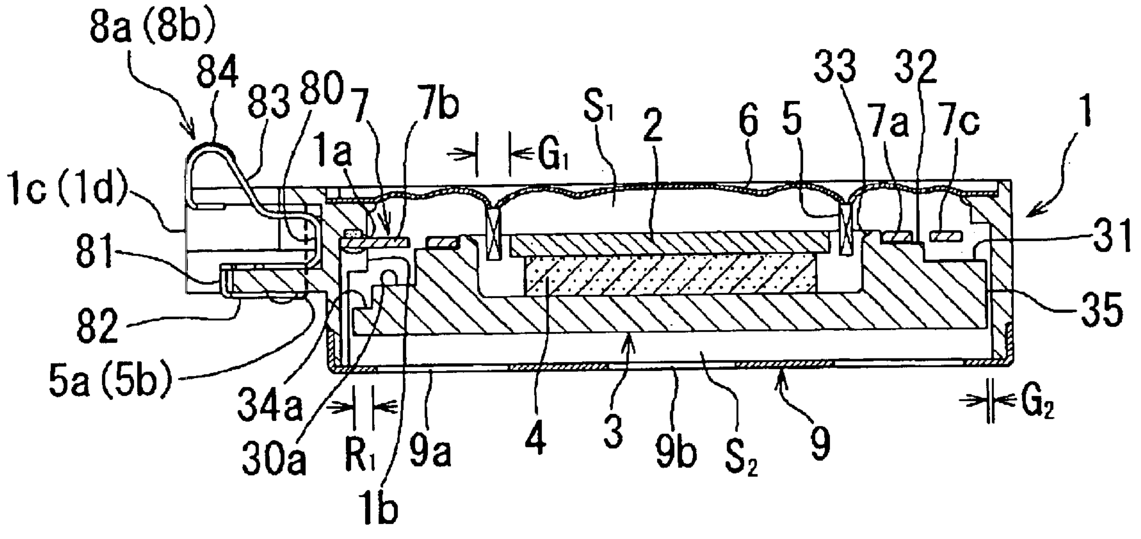
FIG. 9 is a cross-sectional view showing a modification example of the multifunctional vibration actuator of FIG. 8.

Next, a second embodiment of the present invention will be explained with references to FIG. 8 to FIG. 10. The same components and parts as those of the first embodiment will be designated the same reference numerals, and repeating explanation will be omitted.

As described above, it is common that respective parts installed in terminal units are differentiated in capabilities and specifications according to demands of their respective manufacturers. Thus, a desired body-sensible vibration characteristic for the multifunctional vibration actuator varies, and an ideal body-sensible vibration will not be determined uniformly. Therefore, for a multifunctional vibration actuator to be installed in a terminal unit, it is not always appropriate to have a clearance G2 to be as small as possible as the first embodiment, and an internal structure of the actuator is needed to be subtly changed for various demands.

In order to satisfy the above demands, this embodiment is to modify the size of the yoke 3 of the multifunctional vibration actuator in a surface direction (radial direction of the yoke 3) according to the demands. More specifically, as shown in FIG. 8 and FIG. 9, a projecting amount R1 of the yoke 3 toward the inner surface direction of the housing 1 is modified within a range that the inner air in the space S1 functions as a damper, and the yoke 3 is separately manufactured. By modifying and adjusting the clearance G2, amounts of movement of airs in the space S1 and S2 are adjusted and limited, and damper effects of the airs to be applied to up and down vibrations of the magnetic circuit part can be adjusted.

Figure 10:
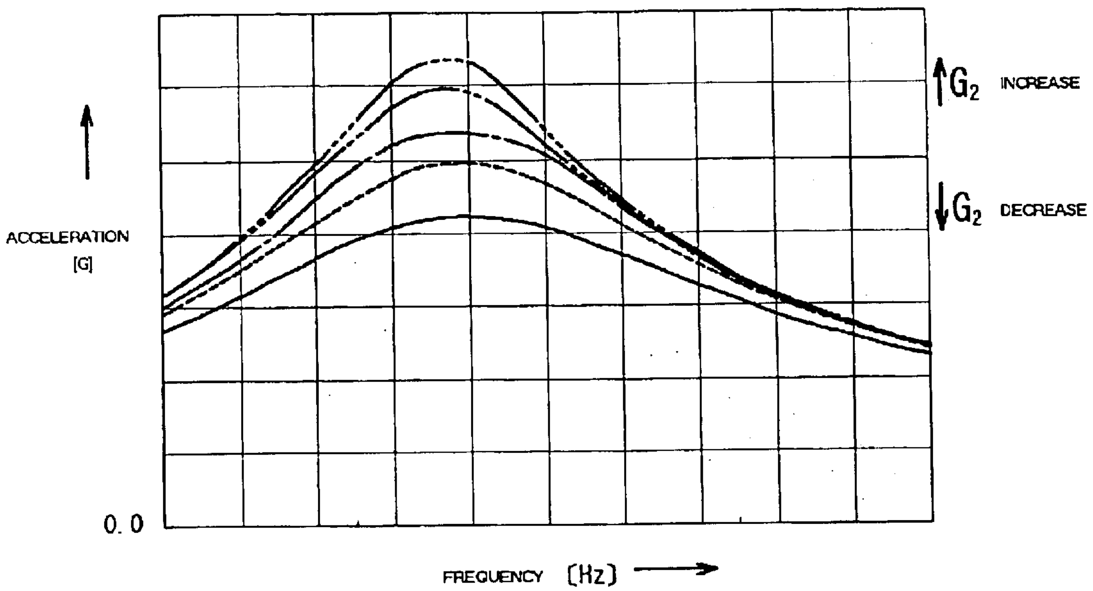
FIG. 10 is a characteristic graph showing changes of a body-sensible vibration characteristic according to a clearance G2.

As exemplary shown in FIG. 10, acceleration can be increased by increasing a size of the clearance G2. On the other hand, the frequency bandwidth can be widened by making a drop of the acceleration gradual by decreasing the size of the clearance G2. All vibration characteristics shown in FIG. 10 are resulted from changing the size of the clearance G2 in a state that a same electrical signal is being applied to the voice coil. The acceleration can be increased by increasing a power value of the electrical signal. Therefore, a sharpness of the resonance can be adjusted by balancing a desired vibration amount with a size of the electrical signal, so that the vibration characteristic can be configured to satisfy the demands.

<Third Embodiment>

Figure 11:
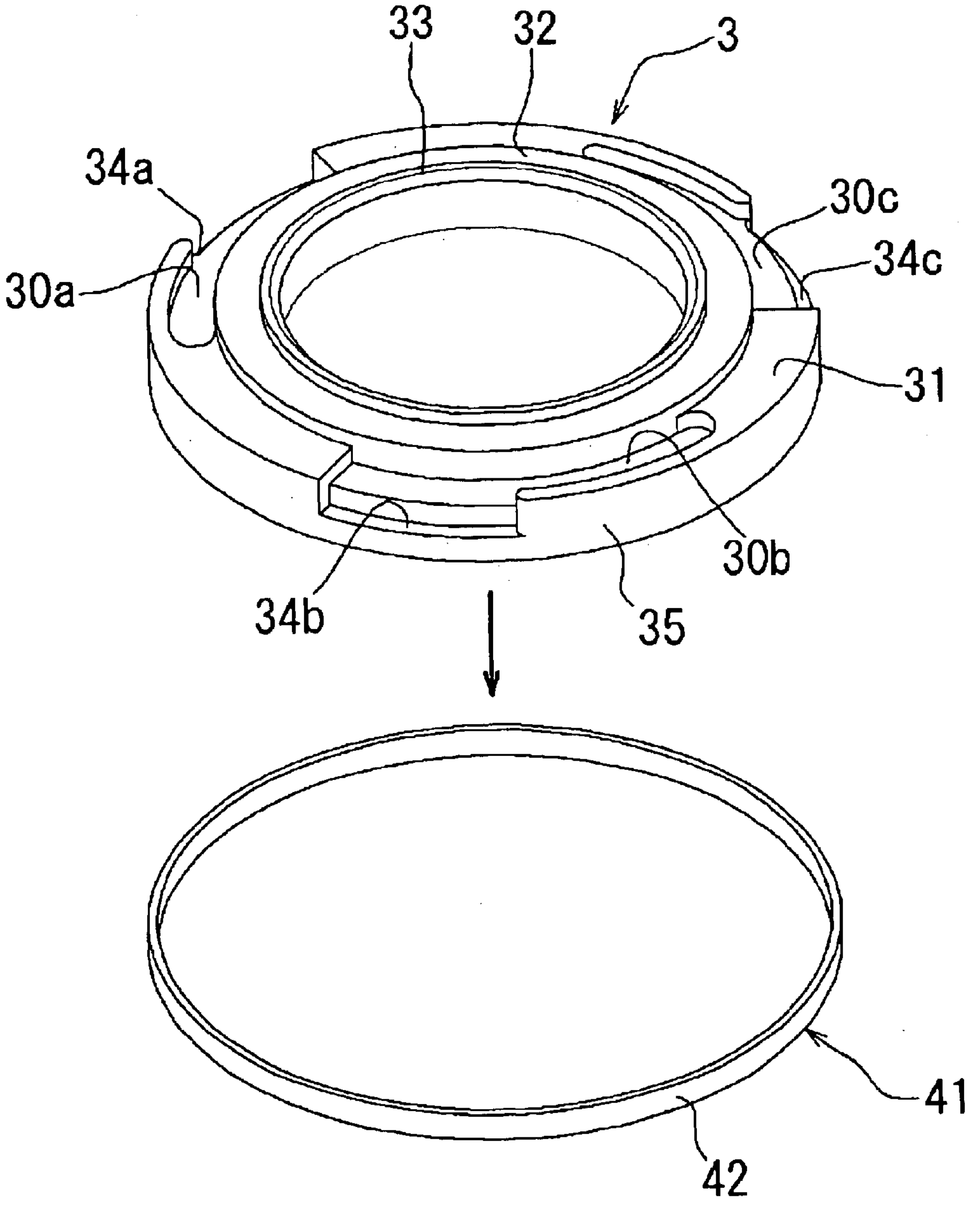
FIG. 11 is a perspective view showing a status of engaging a ring with the yoke to be assembled in a multifunctional vibration actuator according to the present invention.
Figure 12:
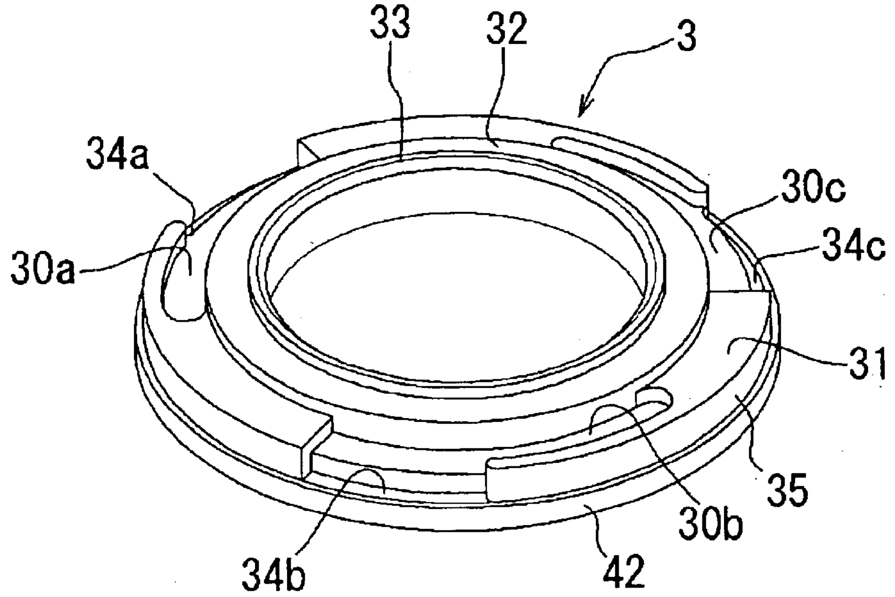
FIG. 12 is a perspective view showing the yoke that is engaged with the ring of FIG. 11.

Next, a third embodiment of the present invention will be explained with references to FIG. 11 to FIG. 15. The same components and parts as those of the first and second embodiments will be designated the same reference numerals, and repeating explanation will be omitted. As the second embodiment, changing the size of the yoke 3 and separately manufacturing it according to a demand require much manufacturing cost, and much time and labor needed for manufacturing. Consequently, to make a modification of the clearance G2 more easily with reduced cost, time, and labor, a ring that conforms to an outer shape of the yoke 3 is engaged with the outer shape surface 35 of the yoke 3. Specific structure examples of the yoke 3 and the ring 41 are shown in FIG. 11 and FIG. 12. The yoke 3 is manufactured smaller in a surface direction so that the clearance is made larger in advance between the outer shape surface of the yoke 3 and the inner surface of the housing 1. Further, several patterns of the ring 41 are prepared with different sizes in a direction parallel to the surface direction of the yoke 3 (surface direction of the ring 41).

By engaging the ring 41 with the outer shape surface of the yoke 3, the clearance G2 between an outer shape surface 42 of the ring 41 and the inner surface of the housing 1 can be freely modified. The size of the ring 41 is modified within a range that, the magnetic circuit part having the yoke 3 with which the ring 41 is engaged being installed in the multifunctional vibration actuator, the outer shape surface 42 of the ring 41 will not contact with the inner surface of the housing 1 when the magnetic circuit part vibrates up and down.

Figure 13:
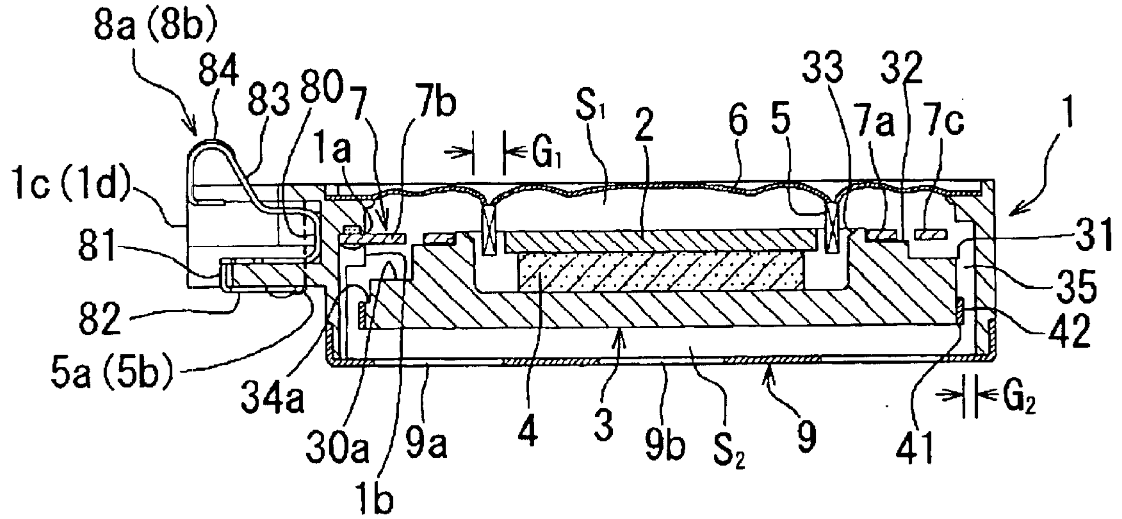
FIG. 13 is a cross-sectional view of a multifunctional vibration actuator in which the yoke of FIG. 12 is installed.
Figure 14:
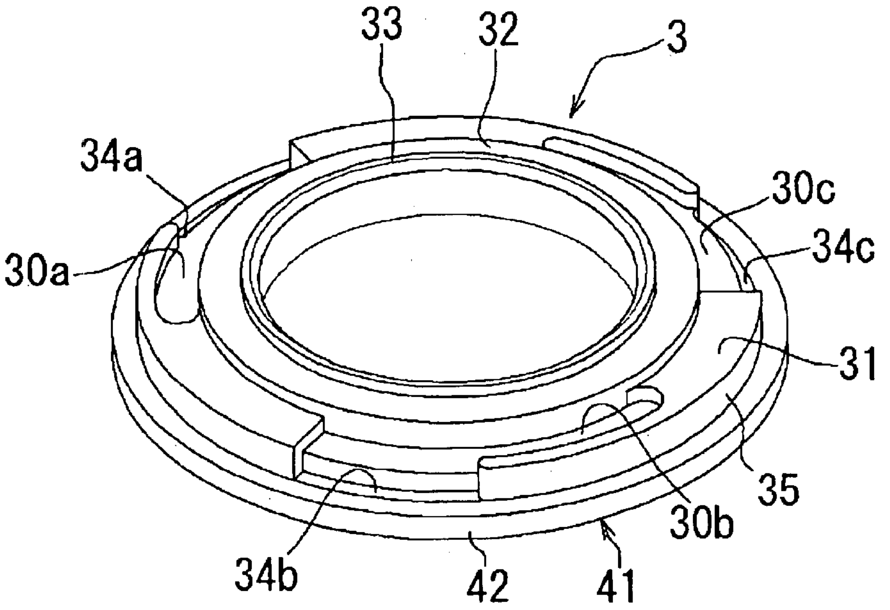
FIG. 14 is a perspective view showing a modification example of the yoke of FIG. 11.
Figure 15:
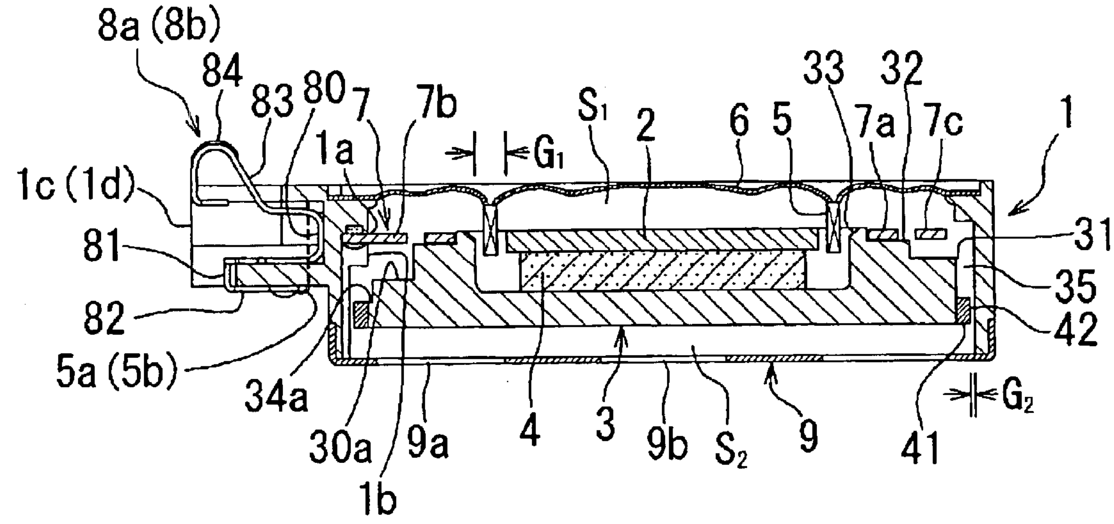
FIG. 15 is a cross-sectional view of a multifunctional vibration actuator in which the yoke of FIG. 14 is installed.

FIG. 13 is a cross-sectional view of a multifunctional vibration actuator in which the yoke 3 of FIG. 12 is installed. FIG. 14 is a perspective view of the yoke 3 with which the ring 41 being expanded in the surface direction is engaged, and FIG. 15 is a cross-sectional view of a multifunctional vibration actuator in which the yoke 3 of FIG. 14 is installed. Accordingly, the size of the yoke 3 can be set constantly, so that the yoke 3 is not needed to be manufactured separately. Further, an inner periphery surface of the ring 41 needs no modification since it has the same size as the outer shape surface 35 of the yoke 3, and then only an outer periphery size of the ring 41 is needed to be modified, so that the sharpness of resonance, the drop of the acceleration, and the frequency bandwidth can be freely changed more easily with a reduced manufacturing cost, time, and labor and with an adjustment of the electrical signal.

As a material for the ring 41, plastic, metal, or a same material as the yoke is considerable, but one that is not elastically deformable is preferable. The reason is that if an elastically deformable ring is engaged with the yoke, and when an external shock is applied to the multifunctional vibration actuator device in a radial direction, the outer shape surface of the ring comes in contact with the inner side surface of the housing, the ring is elastically deformed and crushed, the yoke is further deformed by an amount of the crush, and finally a displacement amount of the magnetic circuit part gets larger. When the displacement amount in the radial direction gets larger, it is conceivable that a suspension fixed to the yoke gets twisted and deformed, and would not return to the original shape. In other words, breakage of the actuator occurs. Therefore, a material that is not elastically deformable is preferable.

<Fourth Embodiment>

Next, a fourth embodiment of the present invention will be explained. The same components and parts as those of the first to third embodiments will be designated the same reference numerals, and repeating explanation will be omitted.

Figure 16:
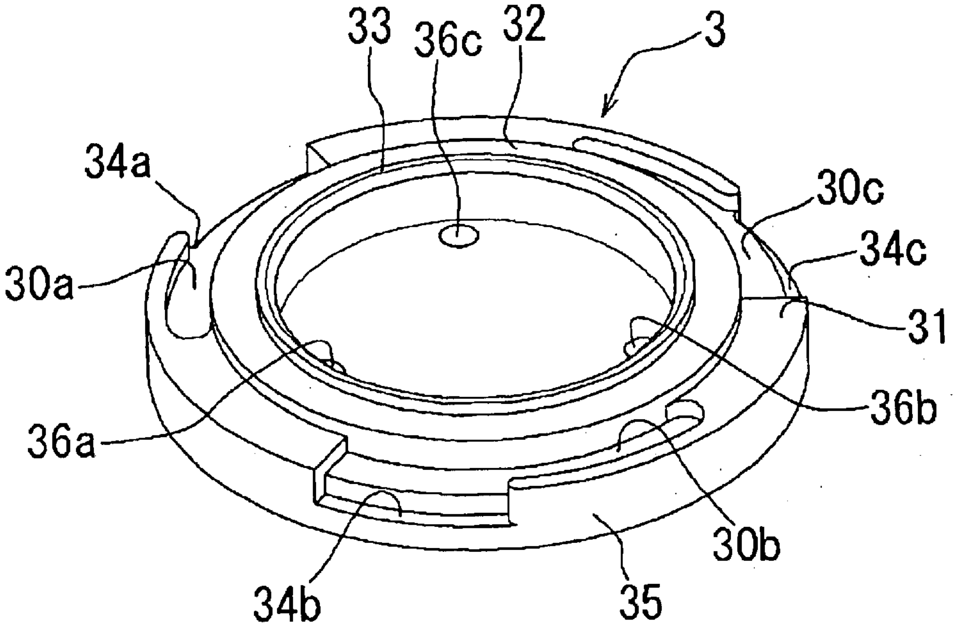
FIG. 16 is a perspective view showing a yoke that is provided with through holes to be assembled in the multifunctional vibration actuator according to the present invention.
Figure 18:
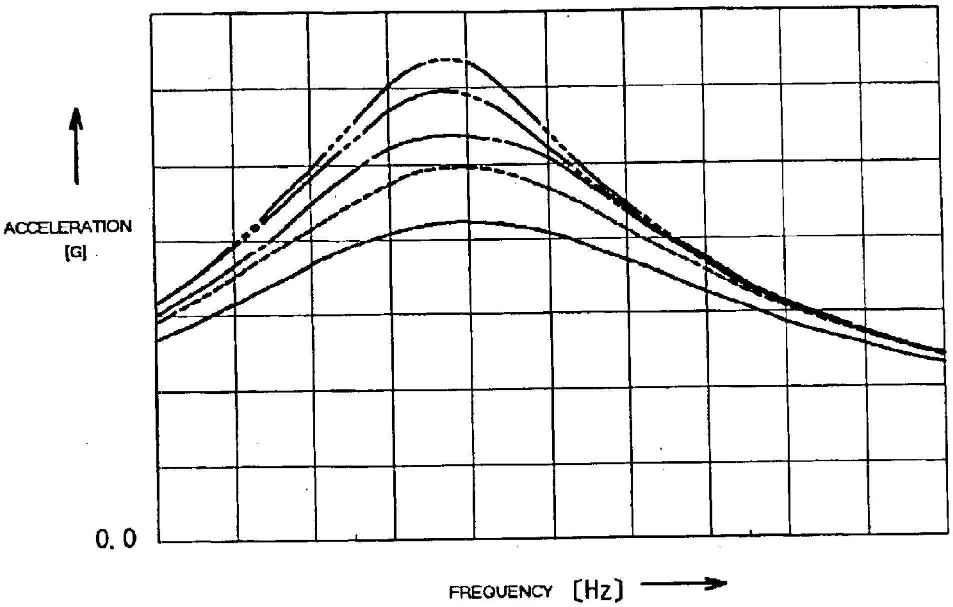
FIG. 18 is a characteristic graph showing changes of a body-sensible vibration characteristic according to the number of through holes provided on the yoke.

This embodiment is to change a setting of a characteristic of body-sensible vibration by providing through holes 36*a* to 36*c* on the yoke 3 as shown in FIG. 16. The through holes 36*a* to 36*c* are provided by penetrating through the yoke 3 to adjust and limit amounts of mutual movement of inner airs between the spaces S1 and S2. In FIG. 18, vibration characteristics are shown respectively, with a power value of the electrical signal to be applied to the voice coil being determined constant, for cases of providing no through hole (refer to the solid line), one through hole (refer to the dashed line), two through holes (refer to the chain dashed line), three through holes (refer to the chain double-dashed line), and four through holes on the yoke 3 (refer to the chain triple-dashed line).

In FIG. 18, the vibration acceleration increases as the number of through holes increases. This is because as the number of holes increases and the mutual movements of airs between spaces S1 and S2 become easier, an air pressure in the space S1 decreases and its function as a damper weakens. Therefore, the sharpness of resonance, the drop of acceleration and the frequency bandwidth can be changed according to the number of holes. Of course, the acceleration can be changed by increasing a power value of the electrical signal to be applied, so it is preferred to determine the number of holes while maintaining balance with a size of the electrical signal.

This embodiment is to realize the above change of the body-sensible vibration characteristic by changing the number of holes. Thus, there is no need to change the size of the yoke and separately manufacture it, or to manufacture a new attachment part such as the ring 41, so that, in addition to the improvement of stability and convenience of the characteristic of a body-sensible vibration, the vibration characteristic can be changed more easily with a reduced manufacturing cost, time, and labor as compared to the second or third embodiments.

In order to maintain a weight balance of the magnetic circuit part, it is preferred that the number of through holes to be provided is changed to relatively one or two on the surface of the yoke 3, or approximately three or six at regular intervals in the radial direction of the yoke 3.

Figure 17:
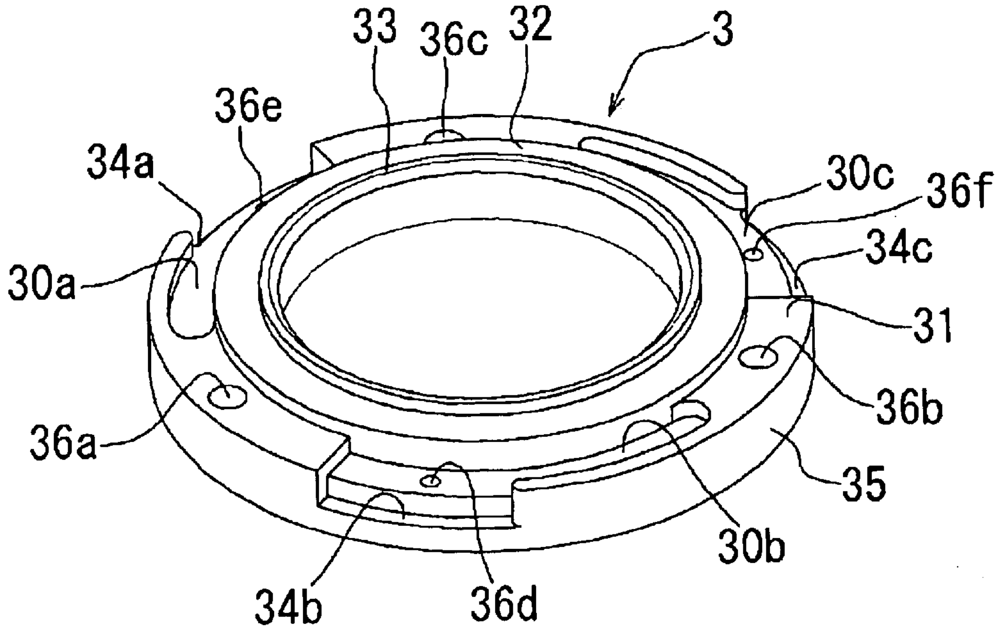
FIG. 17 is a perspective view showing a modification example of the yoke that is provided with through holes.

The fourth embodiment can be modified in various ways according to technical concepts as a matter of course. For example, positions of providing the through holes 36*a* to 36*c* can be changed to the escape portions 30*a* to 30*c* or the step portion surface 31 as shown in FIG. 17. Also, the yoke 3 with which the ring 41 is engaged shown in FIG. 12 may be provided with the through holes. Furthermore, sizes of diameters of the through holes may be changed.

<External Magnet Type Embodiment>

Figure 23:
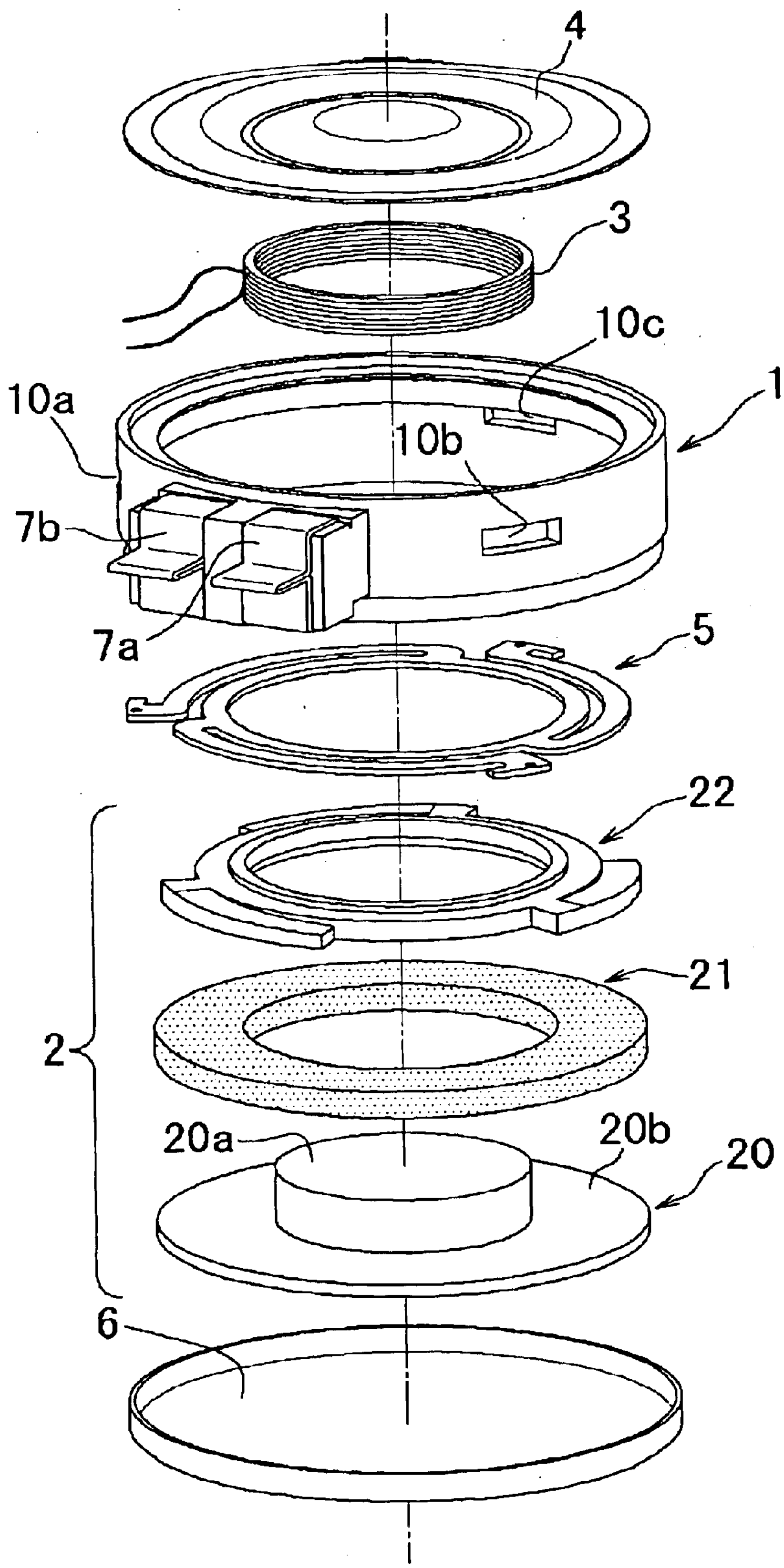
FIG. 23 is a developed perspective view showing respective components of a multifunctional vibration actuator device according to the present invention.

A multifunctional vibration actuator of an external magnet type will be explained below with references to FIG. 23 to FIG. 33. For convenience, a diaphragm side is referred to as "top" and a cover side as "bottom" for the whole device. FIG. 23 to FIG. 27 are showing a basic structure of the multifunctional vibration actuator of an external magnet type. As shown in FIG. 23, its basic structure includes a magnetic circuit part 2 of an external magnet type that is integrally formed by a yoke 20 having a pole piece 20*a* on the center of a disk portion 20*b*, a magnet 21 in a ring shape, and a yoke plate 22 in an approximately ring shape. The rest of the structure includes, as the whole device, an approximately cylindrical housing 1 having openings on both sides, a diaphragm 4 having a voice coil 3 on its surface, a suspension 5, and a cover 6.

Figure 24:
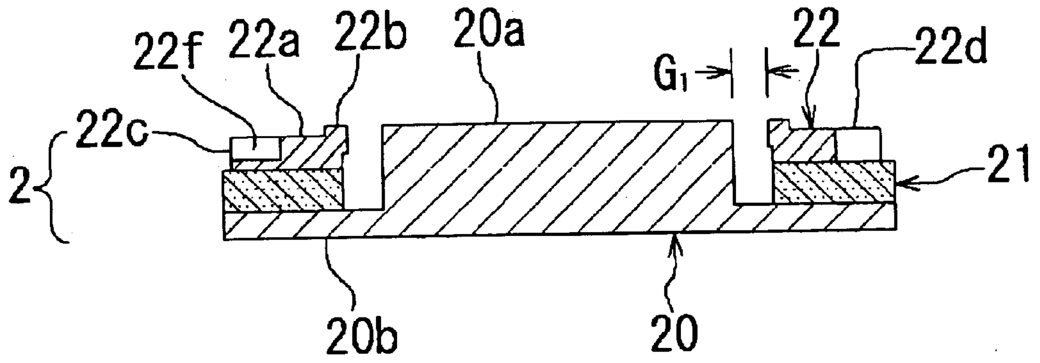
FIG. 24 is a cross-sectional view showing a magnetic circuit part to be assembled in the multifunctional vibration actuator device of FIG. 23.

The magnetic circuit part 2 is, as shown in FIG. 24, formed as an external magnet type by arranging the pole piece 20*a* within each inner periphery of the magnet 21 and the yoke plate 22, providing a gap G1 that affects as a magnetic gap separately between a periphery surface of the pole piece 20*a* and each inner surface of the magnet 21 and the yoke plate 22, and integrally placing the three parts, the yoke 20 and the yoke plate 22 with the magnet 21 intervening therebetween.

Figure 25:
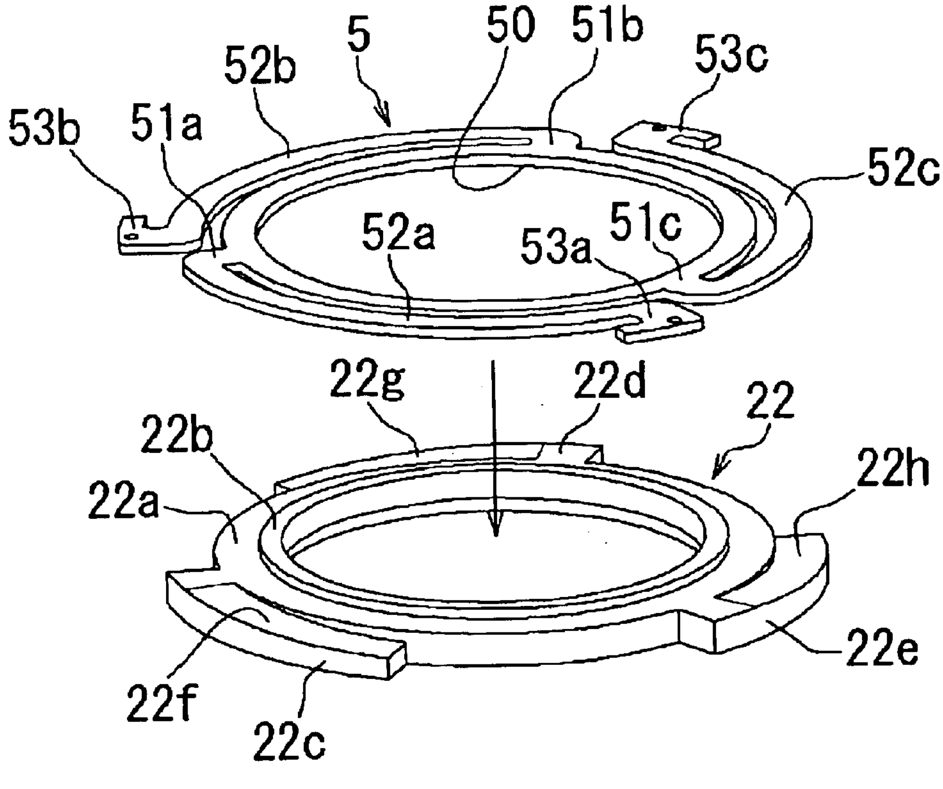
FIG. 25 is a developed perspective view showing a suspension and a yoke plate to be assembled in the multifunctional vibration actuator device of FIG. 23.

As the suspension 5, as shown in FIG. 25, a supporting portion 50 is formed in a ring shape that fixedly supports the magnetic circuit part, and is having three spring arms 52*a* to 52*c* being elongated in a same direction from root portions 51*a* to 51*c* equally spaced by 120° along a circular shape of the supporting portion 50. Further, fixing pieces 53*a* to 53*c* as attaching parts to the housing are formed on each end of the spring arms 52*a* to 52*c*.

The yoke plate 22, as shown in FIG. 25, has a ring portion 22*a* as a main body and a snap ring 22*b* formed along its inner periphery edge for holding the supporting portion 50. Further, for effectively guiding a magnetic flux from the magnet 21 to the magnetic gap G1, three projecting flange portions 22*c* to 22*e* according to the number of spring arms equally spaced by 120° are formed on an outer periphery surface of the ring portion 22*a*.

Arranged positions and lengths in a radial direction of the projecting flange portions 22*c* to 22*e* are predetermined such that the projecting flange portions 22*c* to 22*e* will not overlap with the fixing pieces 53*a* to 53*c* in order not to contact with the fixing pieces 53*a* to 53*c* when the magnetic circuit part 2 vibrates upward and reaches a top dead center. Further, top portion surfaces of the projecting flange portions 22*c* to 22*e* are chamfered by taper portions 22*f* to 22*h* from positions that avoid contacts with the spring arms 52*a* to 52*c* when the magnetic circuit part 2 vibrates upward, which incline in a direction from the root portions 51*a* to 51*c* to the fixing pieces 53*a* to 53*c*.

Figure 26:
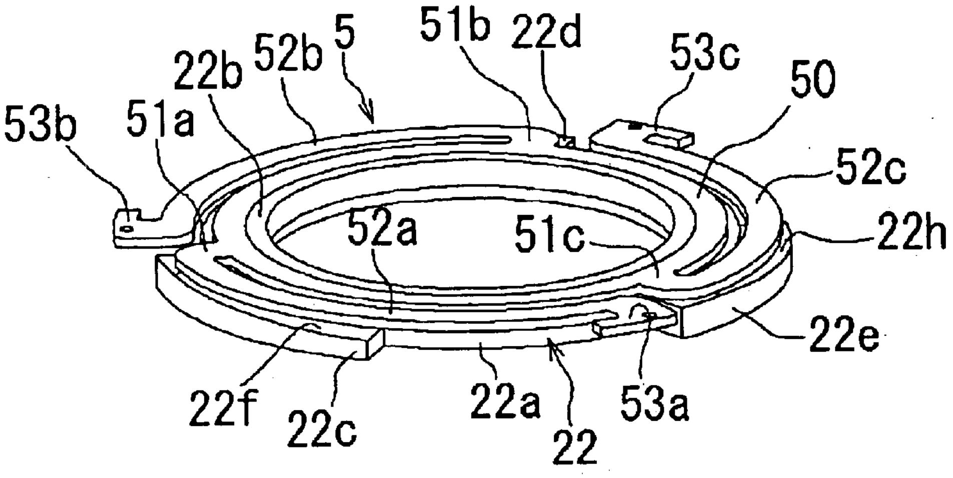
FIG. 26 is a perspective view showing the suspension and the yoke plate of FIG. 25 assembled together.

The suspension 5 is, as shown in FIG. 26, assembled and fixed on the yoke plate 22 by engaging the supporting portion 50 of the suspension 5 with the snap ring 22*b* of the yoke plate 22 and placing on a surface of the ring portion 22*a*, arranging the root portions 51*a* to 51*c* on top sides of non-taper surfaces of the projecting flange portions 22*c* to 22*e*, arranging the spring arms 52*a* to 52*c* on top sides of the taper portions 22*f* to 22*h*, and arranging the fixing pieces 53*a* to 53*c* near edge surfaces of the projecting portions 22*c* to 22*e*.

Figure 27:
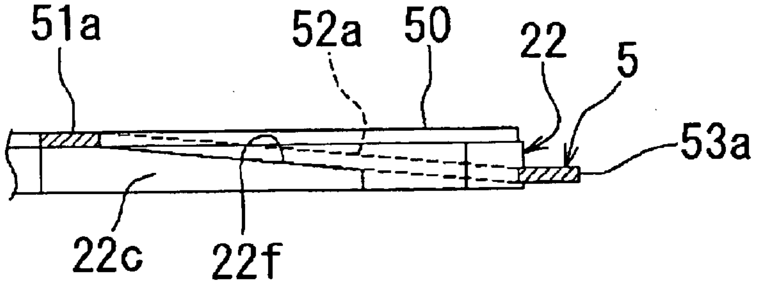
FIG. 27 is a side view showing a deflection status of a spring arm of the suspension in assembled status of FIG. 26.

As shown in FIG. 27, since the above structure allows the spring arms 52*a* to 52*c* to deflect on the top sides of the taper portions 22*f* to 22*h*, the spring arms are assembled with the magnetic circuit part so as to allow the magnetic circuit part formed with a yoke plate 22 to vibrate largely to reach the top dead center.

The suspension 5 supports the magnetic circuit part 2 inside the housing 1 by attaching the fixing pieces 53*a* to 53*c* of the spring arms 52*a* to 52*c* to a side surface of the housing 1. The diaphragm 4 arranges the voice coil 3 inside the magnetic gap G1, and an outer periphery edge of the diaphragm 4 is fixed to an opening edge of the housing 1 to cover one opening of the housing 1. The cover 6 is assembled to the other opening by engaging its outer periphery edge with the other opening edge of the housing 1 to cover the other opening of the housing 1.

According to the above basic structure of the multifunctional vibration actuator of an external magnet type, a fifth to eighth embodiments will be explained.

<Fifth Embodiment>

Figure 28:
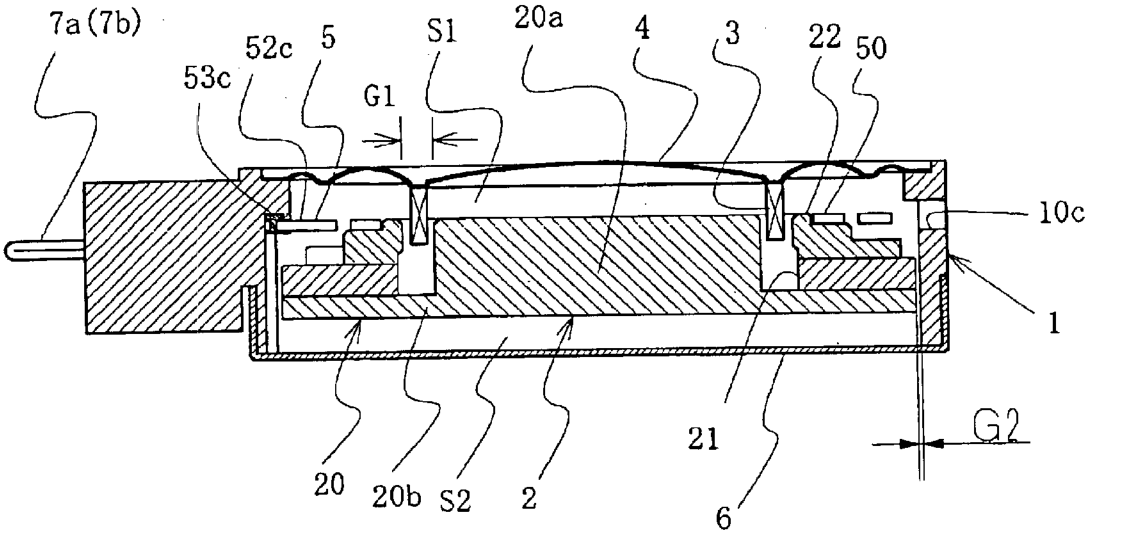
FIG. 28 is a cross-sectional view showing a multifunctional vibration actuator device according to a fifth embodiment of the present invention.

In a fifth embodiment, a plurality of through holes 10*a* to 10*c* are provided on a side surface of the housing 1 as shown in FIG. 23 and FIG. 28. Also, an outer periphery surface of the disk portion 20*b* of the yoke 20 is placed in proximity to an inner side surface of the housing 1 to thereby form a clearance G2 between an outer periphery surface of the yoke and the inner side surface of the housing. Thus, amounts of mutual movement of inner airs are limited in a space S1 formed by the diaphragm 4 and the magnetic circuit part 2 and in a space S2 formed by the magnetic circuit part 2 and the cover.

In this fifth embodiment, numerically according to the number of spring arms 52*a* to 52*c* of the suspension 5, three through holes are provided on the side surface of the housing 1 (refer to numerals 10*a* to 10*c* in FIG. 23), and these through holes are also used for fixing and adhering the fixing pieces (refer to numerals 53*a* to 53*c* in FIG. 26) of the spring arms on each of the through holes to thereby attaching the suspension 5 inside the housing. In addition, as the diaphragm 4 and the cover 6, ones of airtight structure are attached.

<Sixth Embodiment>

In a sixth embodiment, similarly to the second embodiment of an internal magnet type, a size in a surface direction of the yoke 20 (a radial direction of the disk portion 20*b*) is changed according to a demand. In other words, the yoke is separately manufactured so that a diameter size of the disk portion 20*b* relative to the inner side surface of the housing 1 is modified within a range that an inner air in the space functions as a damper. Accordingly, mutual movements of inner airs in the spaces S1 and S2 are adjusted and limited in order to adjust the damper effects of the airs to be applied to upward and downward vibrations of the magnetic circuit part.

<Seventh Embodiment>

Figure 29:
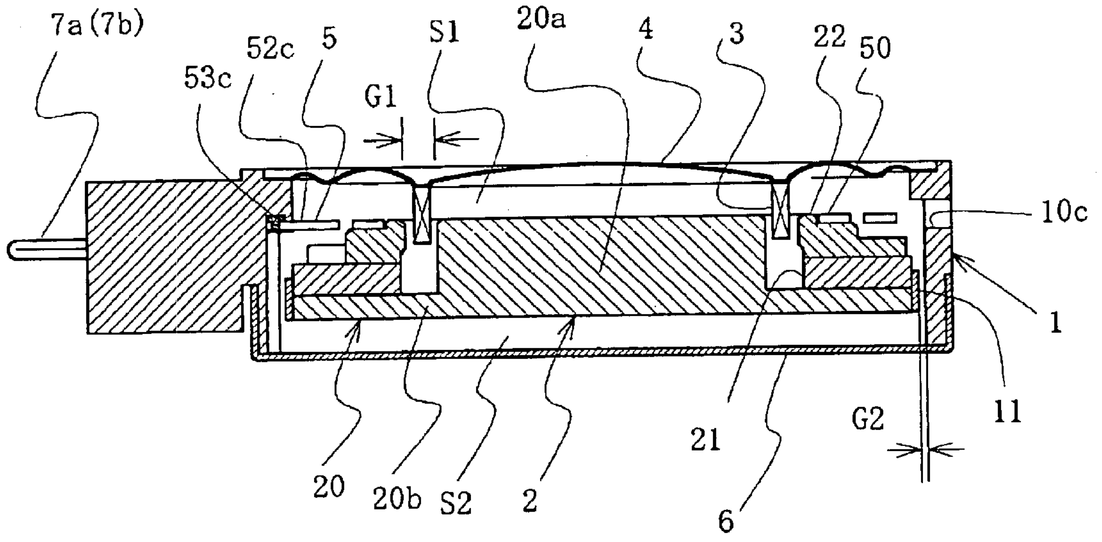
FIG. 29 is a cross-sectional view showing a multifunctional vibration actuator device according to a seventh embodiment of the present invention.
Figure 30:
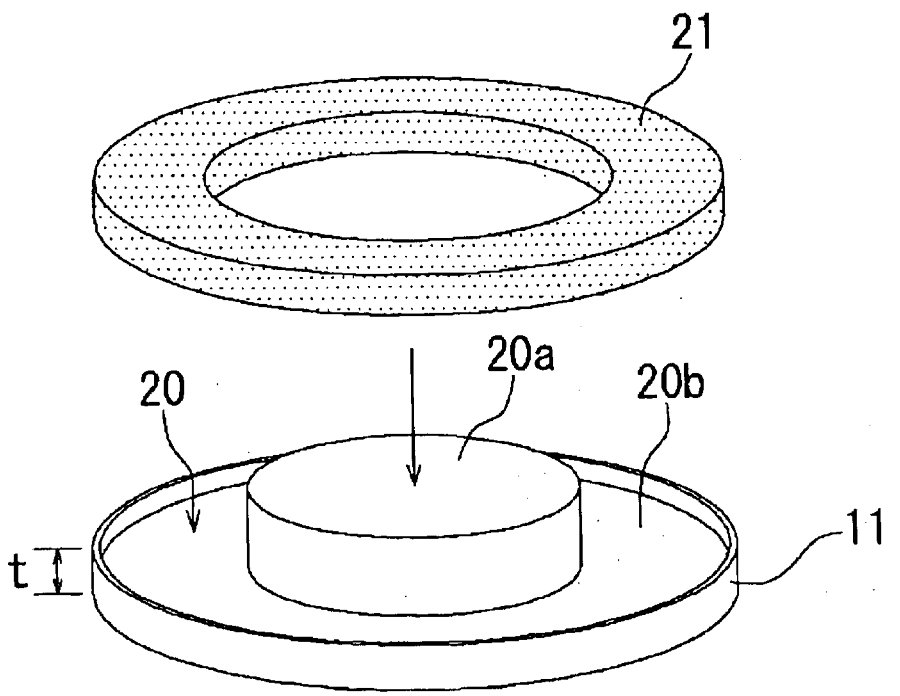
FIG. 30 is a developed perspective view showing a yoke, a magnet, and a ring assembled in the multifunctional vibration actuator device of FIG. 29.

As shown in FIG. 29 and FIG. 30, similarly to the third embodiment of an internal magnet type, the structure may include a ring 11 to be engaged with the outer periphery surface of the yoke 20. A thickness "t" of the ring 11 should be determined to cover an external diameter surface of the magnet 21 so that a predetermined air braking is applied between the external diameter and an internal diameter of the housing 1. An explanation of an effect of providing the ring is omitted since it is similar to that of the third embodiment.

<Eighth Embodiment>

Figure 31:
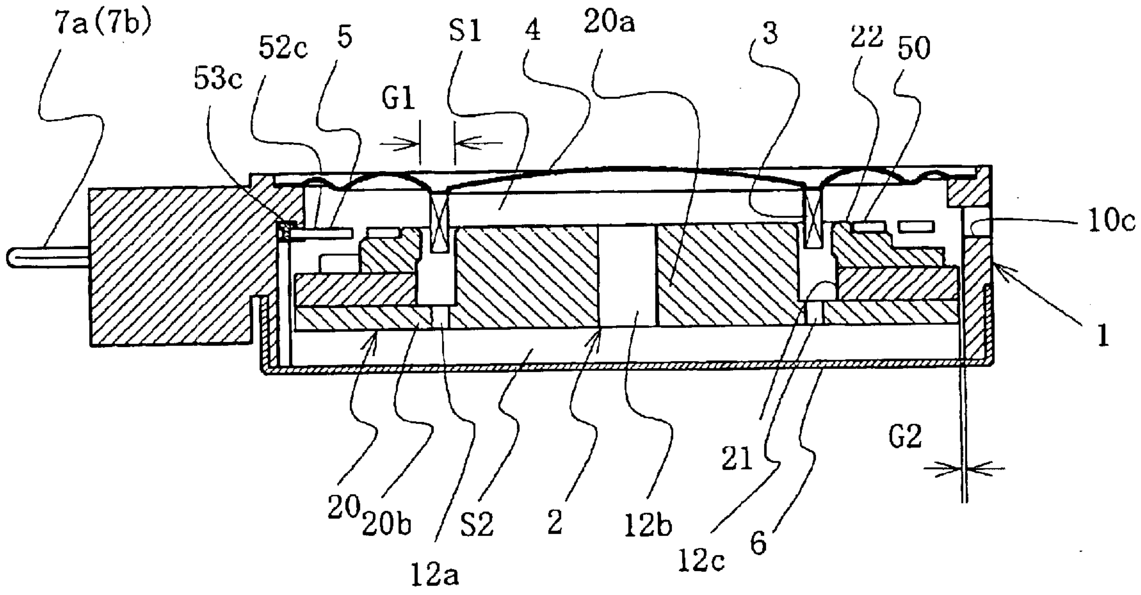
FIG. 31 is a cross-sectional view showing a multifunctional vibration actuator device according to an eighth embodiment of the present invention.

In an eighth embodiment, through holes 12*a* to 12*c* are provided on the yoke 20 as shown in FIG. 31, together with the through holes 10*a* to 10*c* and the clearance G2 described above, in order to change a setting of a characteristic of body-sensible vibration. The through holes 12*a* to 12*c* are provided by penetrating the yoke 20 for adjusting and limiting amounts of mutual movement of inner airs in the space S1 and space S2.

The penetrating positions of the through holes can be chosen from, besides both the pole piece 20*a* and the disk portion 20*b* as shown in FIG. 31, either one of the pole piece 20*a* or the disk portion 20*b*. In order to maintain a weight balance of the magnetic circuit part, it is preferred that the number of through holes to be provided is changed to one or two, or approximately three or six at regular intervals in a radial direction.

<Other Embodiments>

Figure 32:
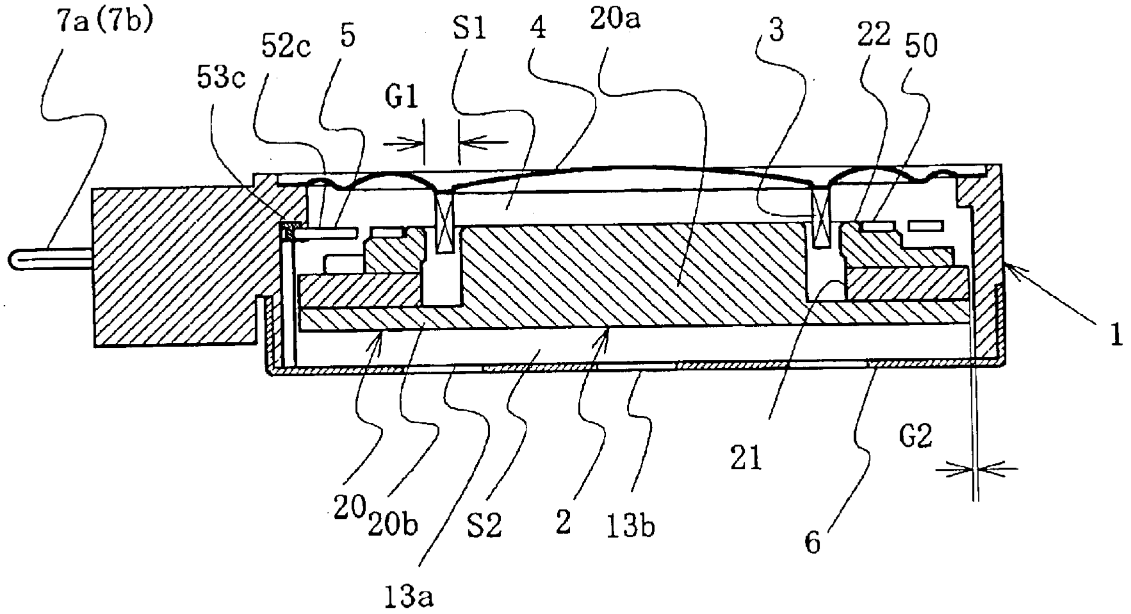
FIG. 32 is a cross-sectional view showing a multifunctional vibration actuator device according to other embodiments of the present invention.
Figure 33:
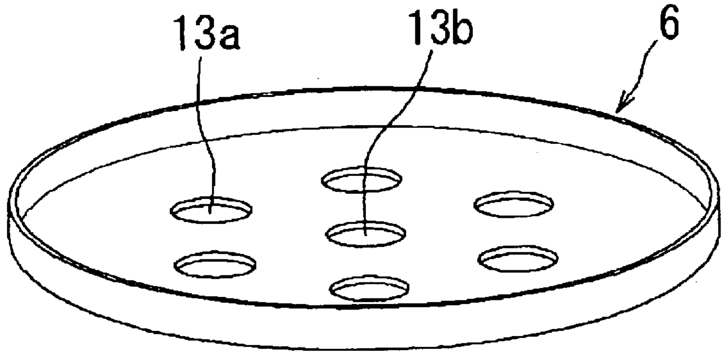
FIG. 33 is a perspective view showing a cover to be placed on the multifunctional vibration actuator device of FIG. 32.

Instead of the structures having through holes on the housing as the above-mentioned embodiments of an external magnet type, a multifunctional vibration actuator device may be structured to have plural through holes 13*a*, 13*b*, and so forth on the cover 6 and no through hole on the housing 1 as shown in FIG. 32 and FIG. 33.

The terms and expressions which have been used in this specification are merely used as explanations, and they do not restrict any content of the present invention. Therefore, although cases having one suspension are explained as examples in the first to eighth embodiments, they are also applicable to the type having two suspensions as the multifunctional vibration actuator shown in FIG. 19. More specifically, in case of the multifunctional vibration actuator shown in FIG. 19, a clearance for limiting an amount of movement of an air can be formed by placing a side surface of the stopper ring in proximity of an inner surface of the housing.

Also, examples of the multifunctional vibration actuator of an internal magnet type and the multifunctional vibration actuator of an external magnet type are explained in the first to eighth embodiments, but the present invention is not limited to these types. Therefore, the present invention is applicable to a multifunctional vibration actuator of a radially oriented type, which is not shown in the drawings. More specifically, a clearance for limiting an amount of movement of an air can be formed by placing a side surface of a moving part or a magnetic circuit part of the multifunctional vibration actuator of radially oriented type in proximity of an inner surface of a housing. Structures of the magnetic circuit part or the moving part are not limited to those explained in the first to eighth embodiments of the present invention.

Furthermore, in the first to eighth embodiments of the present invention, although the type of housing that has openings on both sides and a cover being provided on the other side of the diaphragm is explained, the present invention is not limited to this type, and the housing may be formed in a bottomed cylindrical shape.

Although specific sizes and numbers have been used in several parts of the specification, these values are described for convenience of explanation and not as restriction for the present invention.

As described above, when restrictive terms or explanation are tentatively used in this specification, there is no intention to exclude equivalents of the above-described embodiments of the present invention or any part of them. Therefore, various modifications can be made within a scope of the claimed rights of the present invention.

Industrial Availability

As has been described, the present invention utilizes air resistance, which is generated when an air inside a multifunctional vibration actuator passes through a clearance, to brake a magnetic circuit part or a moving part. Also, the clearance is made small to generate air resistance, so that a rising characteristic and a falling characteristic of the multifunctional vibration actuator become smooth, and a control of vibration becomes easy. Further, the air inside a multifunctional vibration actuator is used as a damper, and by utilizing its damper effect to absorb movements of upward and downward vibrations of the magnetic circuit part, a frequency bandwidth in which an amount of body-sensible vibration needed for incoming call notification is obtained can be enhanced. Thus, an acceleration needed for body sensible vibrations can be obtained from a much wider frequency bandwidth, so that a resonance point can be easily determined. Therefore, a desired vibration acceleration can be easily obtained, and stability and convenience of a characteristic of body-sensible vibration will be improved.

Further, the present invention enables a drop of acceleration relative to a variation width of the frequency to be more gradual. Accordingly, in case a shift of resonance point between each multifunctional vibration actuator attributed by manufacturing occurs and causes a dispersion of body-sensible vibration characteristic, or in case an environment of using a terminal unit having the multifunctional vibration actuator changes and causes a shift of resonance point, a rapid drop of an amount of body-sensible vibration can be prevented, and the problem that the needed amount of body-sensible vibration cannot be obtained can be prevented.

Further, an air inside the multifunctional vibration actuator is used as a damper, and by utilizing its damper effect to absorb movements of upward and downward vibrations of the magnetic circuit part, an abnormal sound of a portable terminal unit during a call waiting status can be reduced.

Also, the multifunctional vibration actuator according to the present invention is capable of applying to a voice coil a larger power as compared to the conventional multifunctional vibration actuator.

Further, a body-sensible vibration characteristic can be modified according to a demand of each manufacturer of portable terminal unit by modifying a size in surface direction of the magnetic circuit part.

In the present invention, to add to the above effects, a ring which conforms to an outer shape of a yoke is engaged with an outer shape surface of the yoke, and a clearance between an outer shape surface of the ring and an inner side surface of the housing is adjusted by a size of the ring in a surface direction, so that a sharpness of resonance, a drop of acceleration, and a frequency bandwidth can be freely changed more easily with reduced manufacturing cost, time and labor.

Furthermore, in the present invention, to add to the above effects, by changing a body-sensible vibration characteristic by providing a through hole on the magnetic circuit part, the body-sensible vibration characteristic can be changed more easily with reduced manufacturing cost, time and labor.

What is claimed is:

1. A multifunctional vibration actuator comprising an approximately cylindrical housing having openings on both sides, a magnetic circuit part in which a pole piece and a yoke are integrally fixed and formed on a magnet so as to form a gap that affects as a magnetic gap, a diaphragm having a voice coil being attached on a surface, a suspension having a supporting portion that fixedly supports said magnetic circuit part, a cover to cover one of the openings, said diaphragm arranging said voice coil in the magnetic gap and being adhered on an edge of said housing so as to cover an opening on the opposite side of the opening being covered by said cover, a plurality of arms being elongated from an outer shape of the supporting portion along the outer shape, ends of the elongated arms being fixed on an inner side surface of said housing, and said magnetic circuit part vibrating in said housing by deflection of the arms upon application of an electrical signal to said voice coil, wherein at least one component of said housing, said diaphragm, and said cover is provided with a through hole, and an outer shape surface of said yoke is placed in proximity of the inner side surface of said housing to form a clearance, wherein said clearance is adjusted so that a frequency bandwidth, in which a vibration of said magnetic circuit part is obtained, can be enhanced by limiting the movement of air in a space formed by said diaphragm and said magnetic circuit part and in a space formed by said magnetic circuit part and said cover.

2. A multifunctional vibration actuator comprising an approximately cylindrical housing having openings on both sides, a magnetic circuit part in which a pole piece and a yoke are integrally fixed and formed on a magnet so as to form a gap that affects as a magnetic gap, a diaphragm having a voice coil being attached on a surface, a suspension having a supporting portion that fixedly supports said magnetic circuit part, a cover to cover one of the openings, said diaphragm arranging said voice coil in the magnetic gap and being adhered on an edge of said housing so as to cover an opening on the opposite side of the opening being covered by said cover, a plurality of arms being elongated from an outer shape of the supporting portion along the outer shape, ends of the elongated arms being fixed on an inner side surface of said housing, and said magnetic circuit part vibrating in said housing by deflection of the arms upon application of an electrical signal to said voice coil, wherein at least one component of said housing, said diaphragm, and said cover is provided with a through hole, and a ring that conforms to an outer shape of said yoke is engaged with an outer shape surface of said yoke to form a clearance between an outer shape surface of said ring and the inner side surface of said housing, wherein said clearance is adjusted so that a frequency bandwidth, in which a vibration of said magnetic circuit part is obtained, can be enhanced by limiting the movement of air in a space formed by said diaphragm and said magnetic circuit part and in a space formed by said magnetic circuit part and said cover.

3. A multifunctional vibration actuator comprising at least an approximately cylindrical housing having openings on both sides, a magnetic circuit part in which a pole piece and a yoke are integrally fixed and formed on a magnet so as to form a gap that affects as a magnetic gap, a diaphragm having a voice coil being attached on a surface, a suspension having a supporting portion that fixedly supports said magnetic circuit part, a cover to cover one of the openings, said diaphragm arranging said voice coil in the magnetic gap and being adhered on an edge of said housing so as to cover an opening on the opposite side of the opening being covered by said cover, a plurality of arms being elongated from an outer shape of the supporting portion along the outer shape, ends of the elongated arms being fixed on an inner side surface of said housing, and said magnetic circuit part vibrating in said housing by deflection of the arms upon application of an electrical signal to said voice coil, wherein at least one component of said housing, said diaphragm, and said cover is provided with a through hole, and said magnetic circuit part is provided with a through hole, wherein said through hole provided at said magnetic circuit part is adjusted so that a frequency bandwidth, in which a vibration of said magnetic circuit part is obtained, can be enhanced by limiting the movement of air in a space formed by said diaphragm and said magnetic circuit part and in a space formed by said magnetic circuit part and said cover.

4. A multifunctional actuator, comprising:

a magnetic circuit part for forming a magnetic path;

a suspension for supporting said magnetic circuit part;

a diaphragm arranged opposite to said magnetic circuit part;

a voice coil attached on said diaphragm and inserted into a magnetic gap formed on said magnetic circuit part; and a housing for accommodating said magnetic circuit part, wherein said magnetic circuit part is arranged such that a side surface of said magnetic circuit part is being separated from an inner surface of said housing by a clearance that limits an amount of movement of an air therebetween;

wherein said clearance is adjusted so that a frequency bandwidth, in which a vibration of said magnetic circuit part is obtained, can be enhanced by limiting the movement of air.

5. A multifunctional actuator, comprising:

a moving part having a magnetic circuit part for forming a magnetic path and a projecting portion that projects in the radial direction of said magnetic circuit part;

a suspension for supporting said moving part;

a diaphragm arranged opposite to said moving part;

a voice coil attached on said diaphragm and inserted into a magnetic gap formed on said magnetic circuit part; and a housing for accommodating said moving part, wherein said moving part is arranged such that a side surface of said projecting portion is being separated from an inner surface of said housing by a clearance that limits an amount of movement of an air therebetween, wherein said clearance is adjusted so that a frequency bandwidth, in which a vibration of said magnetic circuit part is obtained, can be enhanced by limiting the movement of air.

6. A multifunctional actuator, comprising:

a moving part having a magnetic circuit part for forming a magnetic path and a ring formed along a side surface of said magnetic circuit part;

a suspension for supporting said moving part;

a diaphragm arranged opposite to said moving part;

a voice coil attached on said diaphragm and inserted into a magnetic gap formed on said magnetic circuit part; and a housing for accommodating said moving part, wherein said moving part is arranged such that a side surface of said ring is being separated from an inner surface of said housing by a clearance that limits an amount of movement of an air therebetween, wherein said clearance is adjusted so that a frequency bandwidth, in which a vibration of said magnetic circuit part is obtained, can be enhanced by limiting the movement of air.

7. The multifunctional actuator according to any one of claims 4 to 6, wherein said housing is provided with a through hole that adjusts an amount of movement of the air.

8. The multifunctional actuator according to any one of claims 4 to 6, wherein said magnetic circuit part or said moving part is provided with a through hole that adjusts an amount of movement of the air.

9. The multifunctional actuator according to any one of claims 4 to 6, wherein said housing is provided with a through hole that adjusts an amount of movement of the air, and said magnetic circuit part or said moving part is provided with a through hole that adjusts an amount of movement of the air.

* * * * *